United States Patent
Kimura et al.

(10) Patent No.: US 9,965,029 B2
(45) Date of Patent: May 8, 2018

(54) INFORMATION PROCESSING APPARATUS, INFORMATION PROCESSING METHOD, AND PROGRAM

(71) Applicants: SONY CORPORATION, Tokyo (JP); SONY NETWORK ENTERTAINMENT INTERNATIONAL LLC, Los Angeles, CA (US)

(72) Inventors: Jun Kimura, Kanagawa (JP); Tsubasa Tsukahara, Tokyo (JP); Anthony Rogers, Los Angeles, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 0 days. days.

(21) Appl. No.: 14/672,341

(22) Filed: Mar. 30, 2015

(65) Prior Publication Data
US 2016/0291329 A1 Oct. 6, 2016

(51) Int. Cl.
*G06F 3/01* (2006.01)
*G06F 3/0481* (2013.01)
*G06F 3/0487* (2013.01)
*G02B 27/01* (2006.01)

(52) U.S. Cl.
CPC ............ *G06F 3/012* (2013.01); *G02B 27/017* (2013.01); *G02B 27/0172* (2013.01); *G02B 27/0179* (2013.01); *G06F 3/011* (2013.01); *G06F 3/0487* (2013.01); *G06F 3/04815* (2013.01); *G02B 2027/014* (2013.01); *G02B 2027/0178* (2013.01); *G02B 2027/0187* (2013.01); *G06F 2203/04802* (2013.01)

(58) Field of Classification Search
CPC .... G06F 3/0346; G06F 3/0354; G06F 3/0487; G02B 27/017–27/0176; G02B 2027/0174; G02B 2027/0178
See application file for complete search history.

(56) References Cited

U.S. PATENT DOCUMENTS 5,977,935 A * 11/1999 Yasukawa ............ G02B 27/017
340/980
7,928,926 B2 * 4/2011 Yamamoto ........... G02B 27/017
345/8
8,898,771 B1 * 11/2014 Kim ........................ G06F 15/00
700/91

(Continued)

FOREIGN PATENT DOCUMENTS

JP 2011-249906 12/2011

OTHER PUBLICATIONS

Jun. 15, 2016, Partial International Search Report for related International No. PCT/JP2016/001654.

(Continued)

*Primary Examiner* — Patrick F Marinelli
(74) *Attorney, Agent, or Firm* — Paratus Law Group, PLLC

(57) ABSTRACT

There is provided an image processing apparatus including a setting unit configured to set a display mode corresponding to a posture of a user on the basis of posture information indicating the posture of the head of the user.

18 Claims, 13 Drawing Sheets

(56) References Cited

U.S. PATENT DOCUMENTS

| | | | | | |
|---|---|---|---|---|---|
| 8,982,013 | B2* | 3/2015 | Sako | .................... | G02B 27/017 |
| | | | | | 345/156 |
| 9,110,561 | B2* | 8/2015 | Moore | .................. | G06F 3/0481 |
| 9,423,946 | B2* | 8/2016 | Moore | .................. | G06F 3/0481 |
| 9,442,631 | B1* | 9/2016 | Patel | .................... | G06F 3/0482 |
| 9,471,109 | B1* | 10/2016 | Chng | .................... | G06F 1/1677 |
| 2012/0050142 | A1* | 3/2012 | Border | ................ | G09G 3/3611 |
| | | | | | 345/8 |
| 2013/0117707 | A1* | 5/2013 | Wheeler | ................ | G06F 3/012 |
| | | | | | 715/784 |
| 2013/0335301 | A1* | 12/2013 | Wong | ................ | G02B 27/0093 |
| | | | | | 345/8 |
| 2014/0062842 | A1* | 3/2014 | Tachibana | ........... | H04M 1/6058 |
| | | | | | 345/8 |
| 2014/0232620 | A1* | 8/2014 | Fujigaki | ............... | G02B 27/017 |
| | | | | | 345/8 |
| 2014/0282235 | A1* | 9/2014 | Minagawa | .............. | G06F 3/013 |
| | | | | | 715/802 |
| 2014/0368441 | A1* | 12/2014 | Touloumtzis | ........... | G06F 3/017 |
| | | | | | 345/173 |
| 2015/0009132 | A1* | 1/2015 | Kuriya | .................... | G06F 3/012 |
| | | | | | 345/156 |
| 2015/0046867 | A1* | 2/2015 | Moore | .................. | G06F 3/0481 |
| | | | | | 715/781 |
| 2015/0046884 | A1* | 2/2015 | Moore | .................. | G06F 3/0481 |
| | | | | | 715/863 |
| 2015/0378158 | A1* | 12/2015 | Lundberg | ................ | G06K 9/48 |
| | | | | | 345/8 |
| 2015/0378159 | A1* | 12/2015 | Lundberg | ............. | G02B 27/017 |
| | | | | | 345/8 |
| 2016/0018887 | A1* | 1/2016 | Tsukahara | ............. | G06F 1/1694 |
| | | | | | 345/8 |
| 2016/0274722 | A1* | 9/2016 | Putzolu | .................... | G06F 1/1616 |
| 2016/0291329 | A1* | 10/2016 | Kimura | ............... | G02B 27/0172 |
| 2017/0069122 | A1* | 3/2017 | Lee | ........................ | H04N 5/262 |
| 2017/0364162 | A1* | 12/2017 | Fujimaki | .............. | G02B 27/017 |

OTHER PUBLICATIONS

Aug. 9, 2016, International Search Report for related International No. PCT/JP2016/001654.

* cited by examiner

FIG. 2
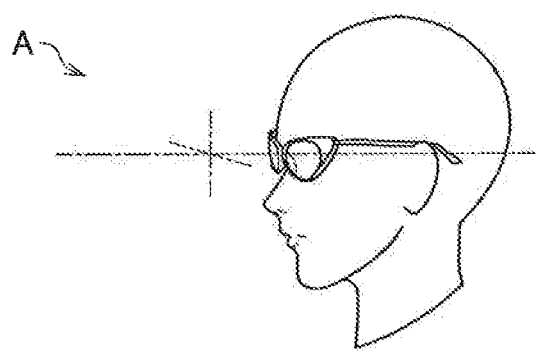
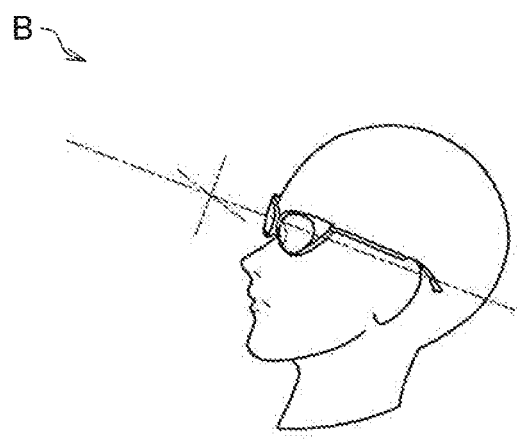
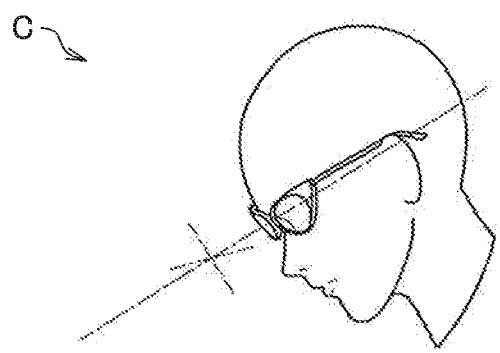

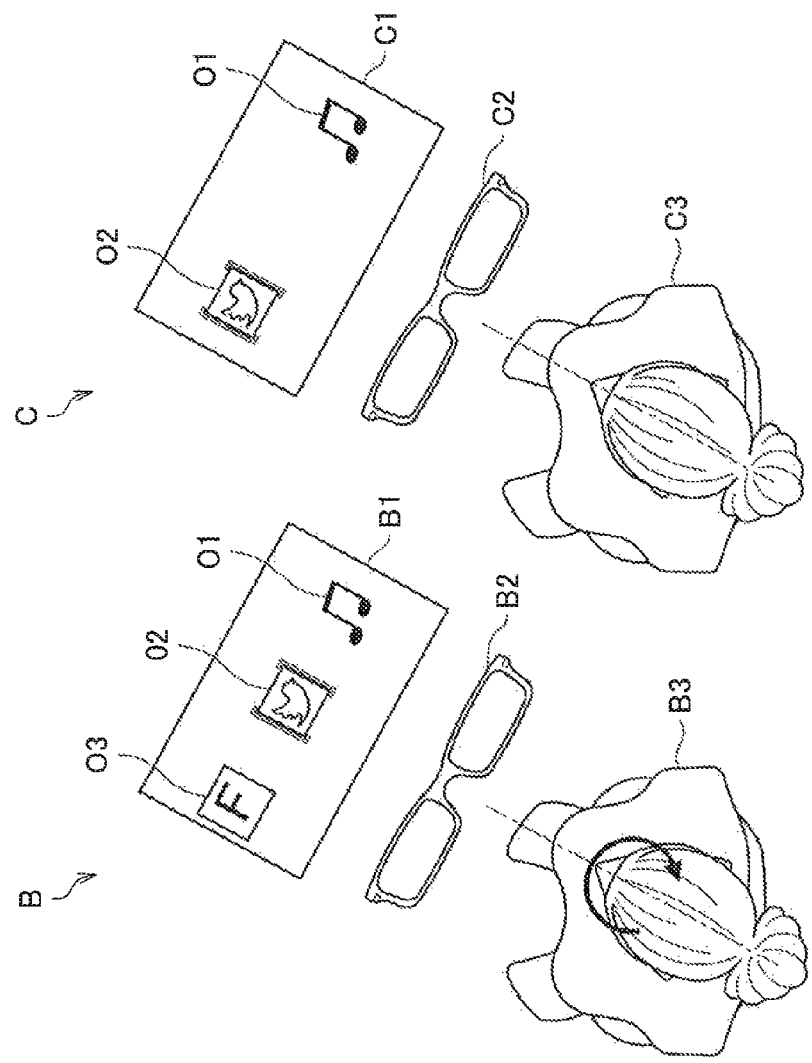
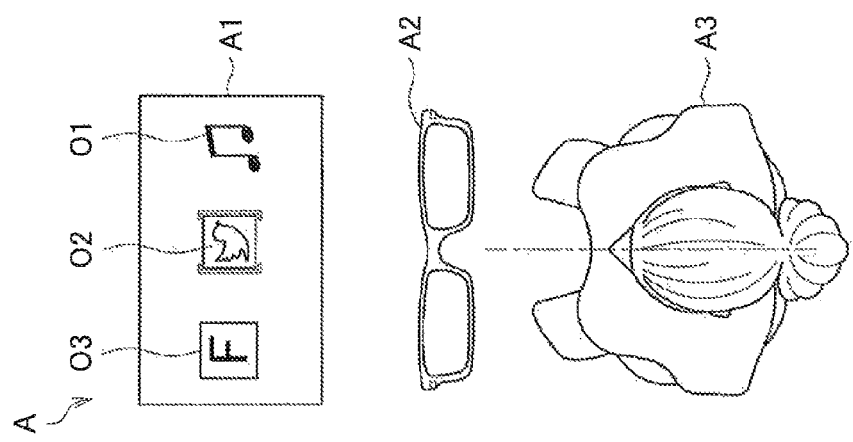
FIG. 7

INFORMATION PROCESSING APPARATUS, INFORMATION PROCESSING METHOD, AND PROGRAM

BACKGROUND

The present disclosure relates to an information processing apparatus, an information processing method, and a program.

There has been developed a display apparatus that is worn by a user so that a display surface is positioned in front of the user, such as a head mounted display (hereinafter referred to as an "HMD"), or an eyewear-type wearable apparatus (hereinafter referred to as an "eyewear") including an eyeglass-type wearable apparatus. An example of a technology related to the HMD includes a technology described in JP 2011-249906A.

SUMMARY

For example, in an apparatus that is mounted on the head of the user when used, such as the HMD or the eyewear, as described in, for example, JP 2011-249906A, an operation device such as a button is provided, and the user allows the apparatus to perform a desired operation by operating the operation device. When the user operates the operation device provided in the HMD or the eyewear for the desired operation, however, the movement of the arm of the user related to the operation, the movement of the display screen by the operation, or the like may increase an operating load and a wearing load of the apparatus, and may harm a user experience (UX).

The present disclosure proposes an information processing apparatus, an information processing method, and a program, which are novel, improved, and capable of enhancing the convenience of the user.

According to an embodiment of the present disclosure, there is provided an image processing apparatus including a setting unit configured to set a display mode corresponding to a posture of a user on the basis of posture information indicating the posture of the head of the user.

According to an embodiment of the present disclosure, there is provided an information processing method that is executed by an information processing apparatus, including setting a display mode corresponding to a posture of a user on the basis of posture information indicating the posture of the head of the user.

According to an embodiment of the present disclosure, there is provided a program for allowing a computer to execute setting a display mode corresponding to a posture of a user on the basis of posture information indicating the posture of the head of the user.

According to one or more embodiments of the present disclosure, the convenience of the user can be enhanced.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 2 is an explanatory diagram for explaining an information processing method according to an embodiment of the present disclosure;

FIG. 7 is an explanatory diagram for explaining a second example of processing related to the information processing method according to an embodiment of the present disclosure;

DETAILED DESCRIPTION OF THE EMBODIMENT(S)

Figure 1:
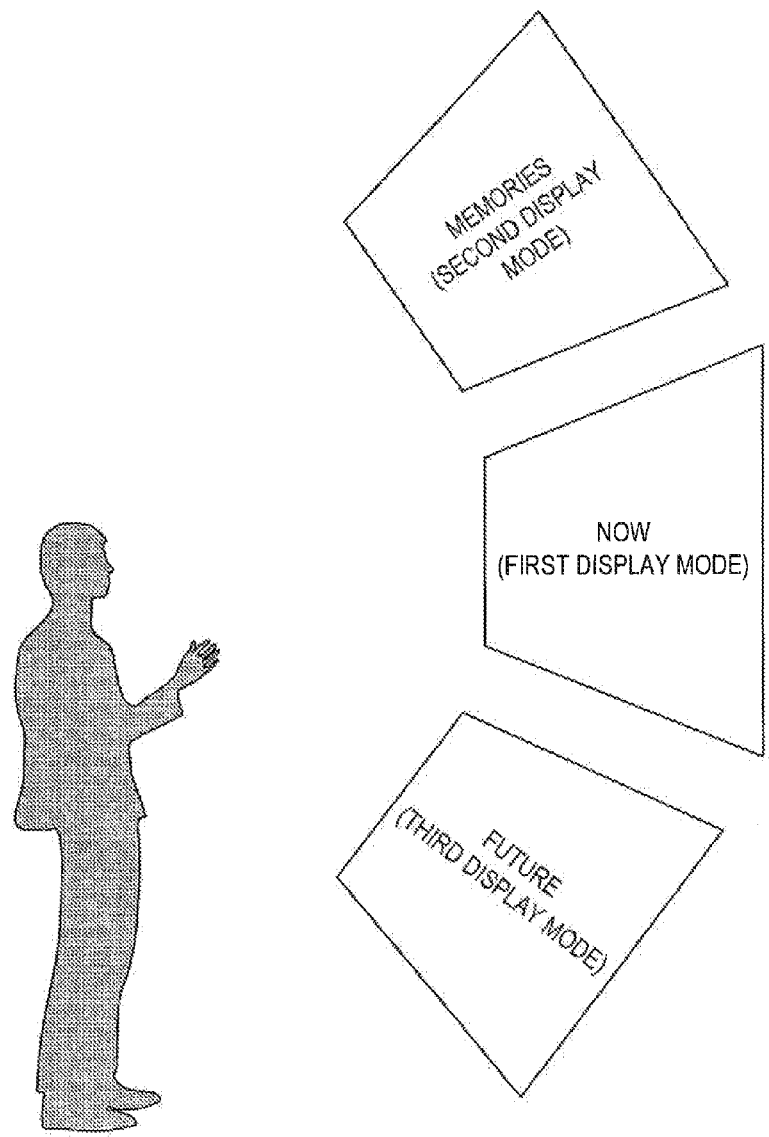
FIG. 1 is an explanatory diagram for explaining an information processing method according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. Information processing method according to an embodiment of the present disclosure
2. Information processing apparatus according to an embodiment of the present disclosure
3. Program according to an embodiment of the present disclosure (Information Processing Method According to an Embodiment of the Present Disclosure)

Before describing the configuration of an information processing apparatus according to an embodiment of the present disclosure, an information processing method according to an embodiment of the present disclosure will first be described. The information processing method according to an embodiment of the present disclosure will be described by taking a case in which processing according to the information processing method according to an embodiment of the present disclosure is performed by an information processing apparatus according to an embodiment of the present disclosure as an example.

Overview of Information Processing Method According to an Embodiment of the Present Disclosure As described above, in the apparatus that is mounted on the head of the user when used, such as the HMD or the eyewear, when the user operates the operation device provided therein, the operating load and the wearing load may be increased, and the UX may be harmed.

Further, it may be possible to allow the apparatus described above to perform an operation desired by the user by voice of the user by using a voice recognition technology. However, it is considered that the use of the voice recognition technology is effective for some operations such as a startup of an application, but is not necessarily effective for a repeated operation such as the movement of a cursor due to an increase in load on the user.

Therefore, an information processing apparatus according to an embodiment of the present disclosure performs processing on the basis of a posture of the head of the user (hereinafter referred to as a "posture of the user" or merely a "posture"). Specifically, the information processing apparatus according to an embodiment of the present disclosure sets a display mode corresponding to the posture of the head of the user, for example, on the basis of posture information indicating the posture of the head of the user (setting processing). Further, the information processing apparatus according to an embodiment of the present disclosure controls display, for example, in the display mode set in the setting processing according to an embodiment of the present disclosure (display control processing).

Here, the posture information according to an embodiment of the present disclosure is data indicating the posture of the head of the user. An example of the posture information according to an embodiment of the present disclosure includes data indicating one or two or more angles of a yaw direction, a pitch direction and a roll direction of the head, such as data indicating an angle of the head to a horizontal direction, and data indicating an angle of the head to a vertical direction. Further, the posture information according to an embodiment of the present disclosure may include, for example, data related to the movement of the head, such as data indicating acceleration. Note that the posture information according to an embodiment of the present disclosure is not limited thereto, and may be any data indicating a value related to the posture of the head of the user.

The posture information according to an embodiment of the present disclosure is generated, for example, based on a detection result of a sensor included in the device mounted on the user (any sensor capable of detecting the posture of the head, such as an angular velocity sensor and an acceleration sensor), or an external sensor connected to the device. Processing related to the generation of the posture information based on the detection result of the sensor may be performed by the sensor, or may be performed in an external apparatus (or an external device) of the sensor.

Further, the device mounted on the user may be the information processing apparatus according to an embodiment of the present disclosure, or may be an external apparatus of the information processing apparatus according to an embodiment of the present disclosure.

Here, when the device mounted on the user is the information processing apparatus according to an embodiment of the present disclosure, the information processing apparatus according to an embodiment of the present disclosure uses, for example, the posture information transmitted from the sensor included in the information processing apparatus according to an embodiment of the present disclosure (or the external sensor connected thereto), for the processing. Further, when the device mounted on the user is the information processing apparatus according to an embodiment of the present disclosure, the information processing apparatus according to an embodiment of the present disclosure may use, for example, the detection result transmitted from the sensor included in the information processing apparatus according to an embodiment of the present disclosure (or the external sensor connected thereto) to generate the posture information and use the generated posture information for the processing.

Moreover, when the device mounted on the user is the external apparatus of the information processing apparatus according to an embodiment of the present disclosure, the information processing apparatus according to an embodiment of the present disclosure uses, for example, the posture information acquired through a communication unit (to be described later) included in the information processing apparatus according to an embodiment of the present disclosure or an external communication device connected to the information processing apparatus according to an embodiment of the present disclosure, for the processing. Further, when the device mounted on the user is the external apparatus of the information processing apparatus according to an embodiment of the present disclosure, the information processing apparatus according to an embodiment of the present disclosure may use, for example, the detection result of the sensor acquired through the communication unit (to be described later) included in the information processing apparatus according to an embodiment of the present disclosure, or the like to generate the posture information, and use the generated posture information for the processing.

Moreover, the display mode according to an embodiment of the present disclosure is, for example, a state related to display specifying one or two or more of software to be executed, how to display a content to be displayed (how to display) and an information amount of the content to be displayed. Here, an example of the software according to an embodiment of the present disclosure includes an application software (hereinafter referred to as an "application"), and a system software. Note that the display mode according to an embodiment of the present disclosure may include any specified content capable of specifying the state related to the display.

FIG. 1 and FIG. 2 are an explanatory diagram for explaining the information processing method according to an embodiment of the present disclosure. FIG. 1 shows an example that three display modes of "NOW" (a first display mode), "MEMORIES" (a second display mode), and "FUTURE" (a third display mode) are set, and display corresponding to the set display mode is performed. Also, FIG. 2 shows an example of the movement of the head of the user related to the setting of the display mode.

For example, when the user faces a horizontal direction (or a nearly horizontal direction), as shown in A of FIG. 2, the display mode "NOW" (the first display mode) shown in FIG. 1 is set, and display according to the set display mode is performed. Further, for example, when the user faces upward at more than a predetermined angle to the horizontal direction (or faces upward at the predetermined angle or more), as shown in B of FIG. 2, the display mode "MEMORIES" (the second display mode) shown in FIG. 1 is set, and display according to the set display mode is performed. Further, for example, when the user faces downward at more than the predetermined angle to the horizontal direction (or faces downward at the predetermined angle or less), as shown in C of FIG. 2, the display mode "FUTURE" (the third display mode) shown in FIG. 1 is set, and display according to the set display mode is performed.

Here, an example of an object on which the display is performed according to the set display mode, includes a display screen of the wearable apparatus worn by the user, such as the HMD, or the eyewear such as a wearable apparatus of an eyeglass type (including a monocle and a binocular). Here, the wearable apparatus described above may be a transmission-type apparatus, or may be a non-transmission-type apparatus. Here, the transmission type includes any type such as a video transmission type in which an outside view is electronically displayed by displaying an image captured by an imaging device on a display screen, or an optical transmission type. Further, a display system for realizing the transmission type includes any display system capable of realizing the transmission type, such as a hologram system, a half-mirror system, or a pupil-division system.

Note that the object on which the display is performed according to the set display mode is not limited to the display screen of the wearable apparatus worn by the user such as the HMD. For example, when display is performed by projecting an image on a building, an object, a space or the like from a projector or the like, the object on which the display is performed according to the set display mode, includes any object capable of displaying an image, such as the building, the object, the space or the like. In the following, there will be described an example that the object on which the display is performed according to the set display mode is the display screen of the wearable apparatus worn by the user such as the HMD.

Figure 3A:
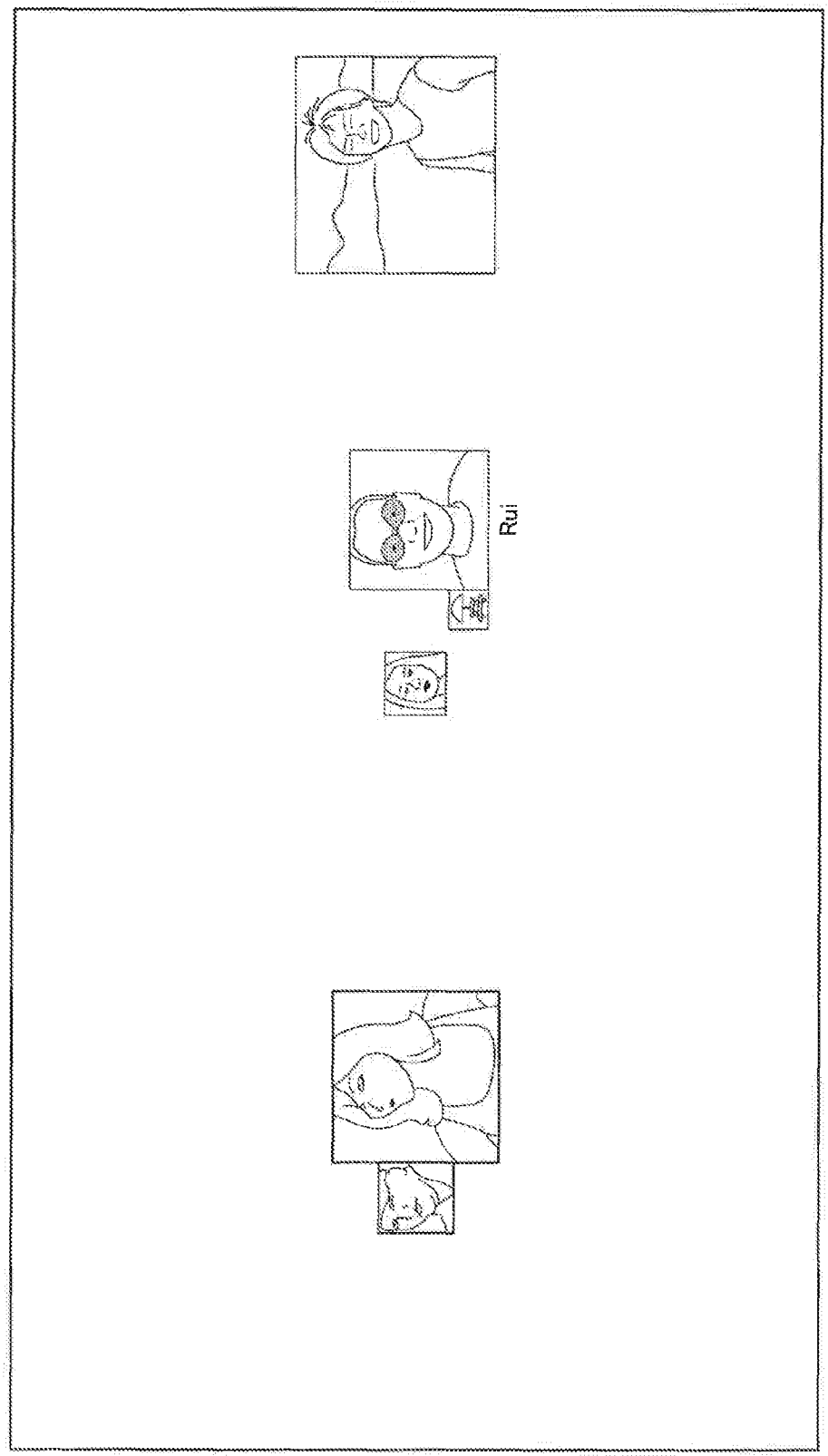
FIG. 3A is an explanatory diagram for explaining an information processing method according to an embodiment of the present disclosure.
Figure 3B:
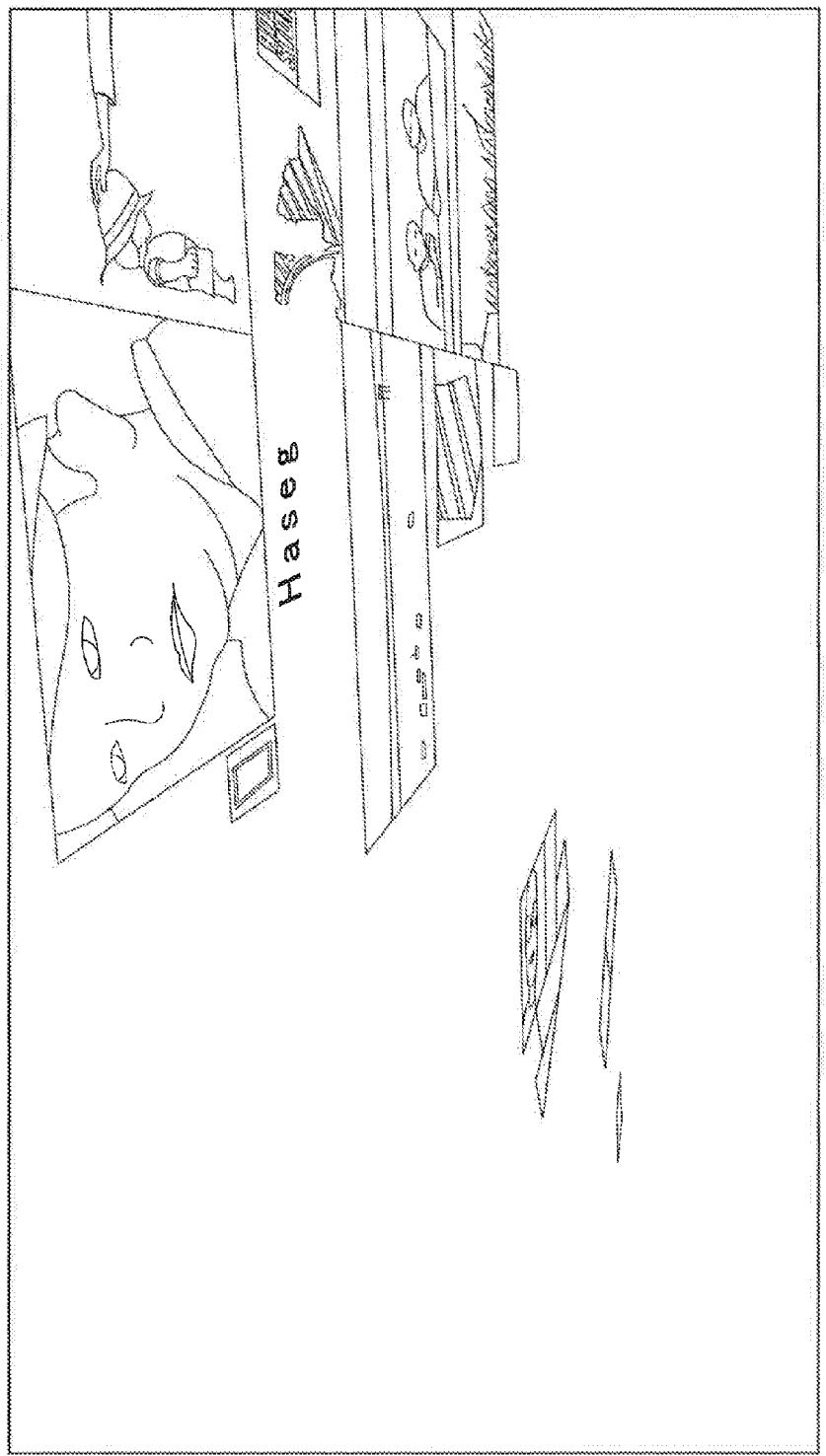
FIG. 3B is an explanatory diagram for explaining an information processing method according to an embodiment of the present disclosure.
Figure 3C:
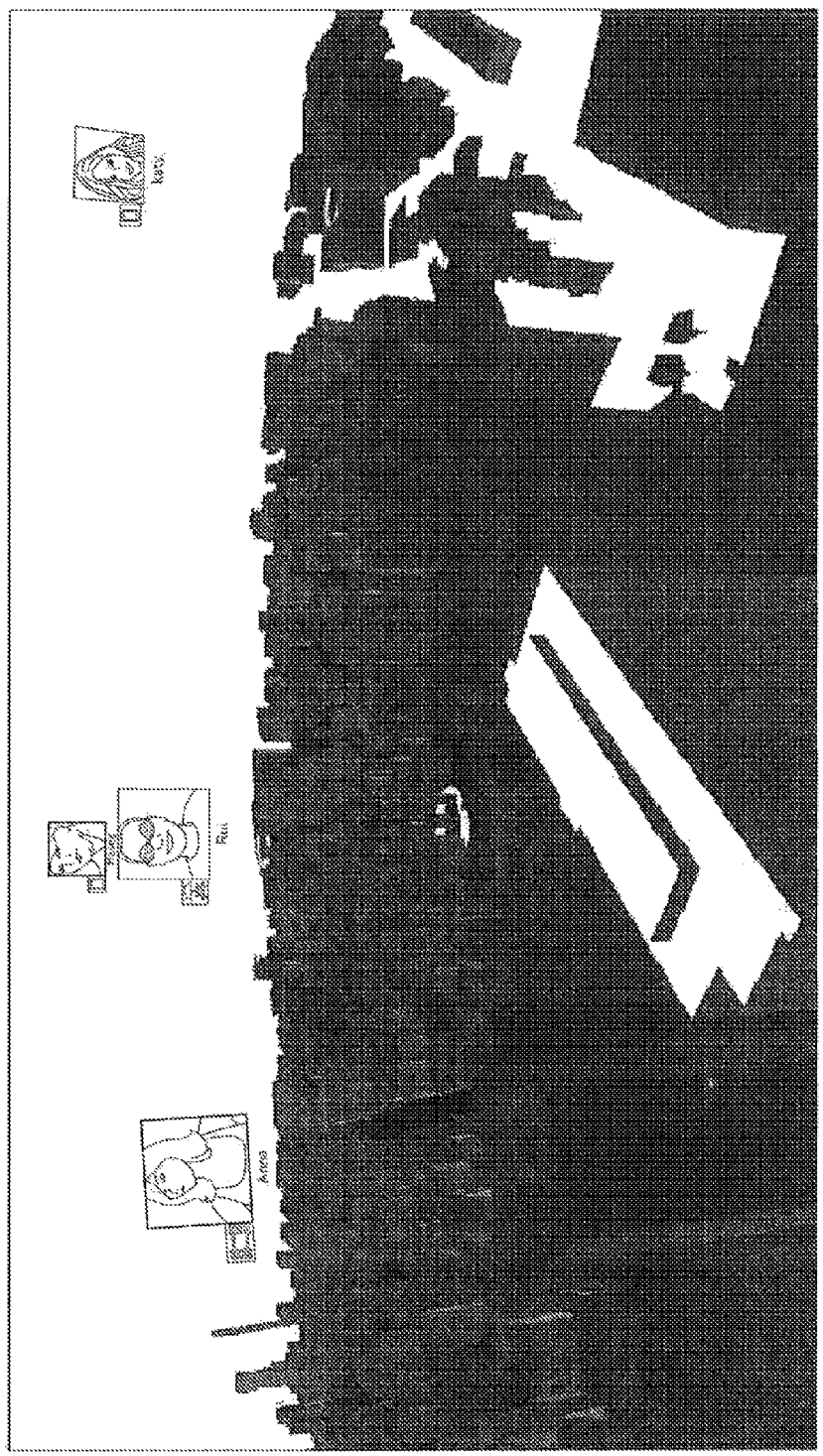
FIG. 3C is an explanatory diagram for explaining an information processing method according to an embodiment of the present disclosure.

FIG. 3A to FIG. 3C are an explanatory diagram for explaining the information processing method according to an embodiment of the present disclosure, and show an example of the content to be displayed according to the set display mode. FIG. 3A shows an example of the content to be displayed in the display mode "NOW" (the first display mode) shown in FIG. 1, FIG. 3B shows an example of the content to be displayed in the display mode "MEMORIES" (the second display mode) shown in FIG. 1, and FIG. 3C shows an example of the content to be displayed in the display mode "FUTURE" (the third display mode) shown in FIG. 1.

In the display mode "NOW" (the first display mode), for example, as shown in FIG. 3A, the icon of another user registered (a so-called friend user) is displayed. In the display mode "NOW" (the first display mode) shown in FIG. 3A, for example, when the user stares at the icon of the specific user, there is displayed a content of information (data) related to the user corresponding to the icon, such as a name of the user (a so-called friend name) corresponding to the icon, an icon indicating what the user corresponding to the icon does, and the like.

Further, in the display mode "MEMORIES" (the second display mode), for example, as shown in FIG. 3B, there is displayed a so-called time line, such as a log (for example, any log such as a log of a social network service (SNS)) corresponding to a specific user, such as the user corresponding to the icon stared at by the user, or a set user. FIG. 3B shows an example that a user interface (UI) is displayed together with such an animation transition expression that the UI is floating in the sky.

In the display mode "MEMORIES" (the second display mode), for example, scrolling is performed at a constant speed. The direction of the scrolling includes any direction, such as a direction from the back to the front. The direction of the scrolling may be one direction, or may be a plurality of directions. Further, the speed of the scrolling may be constant, or may be determined according to a value indicated by the posture information, such as an angle of the head to the horizontal direction.

Further, in the display mode "FUTURE" (the third display mode), as shown in FIG. 3C, there are displayed a three-dimensional map centering around the user corresponding to the posture information, and a UI allowing the position of the user and the position of another registered user to be found. The display of the three-dimensional map may be changed such as rotation display of the map or a change in overview position, by the movement of the visual line or the head of the user, an operation of the operation device by the user corresponding to the posture information, or the like.

Further, in the display mode "FUTURE" (the third display mode), as shown in FIG. 3C, there are displayed, for example, where another user will go from now, or the like, and a content of information such as surrounding buildings, public facilities and restaurants. In the display mode "FUTURE" (the third display mode), as shown in FIG. 3C, for example, when the user stares at the icon of the specific user, the building on the map, or the like, a content of information related to the object to be stared at may be displayed. Further, in the display mode "FUTURE" (the third display mode), as shown in FIG. 3C, the position of the user corresponding to the posture information can be found, allowing navigation to a place desired by the user. In the display mode "FUTURE" (the third display mode), as shown in FIG. 3C, the user corresponding to the posture information can view a content of a wide variety of information in an overview manner.

The content to be displayed according to the set display mode includes, for example, the examples shown in FIG. 3A to FIG. 3C.

Note that an example of the display mode according to an embodiment of the present disclosure and the example of the content to be displayed according to the set display mode are not limited to the examples shown in FIG. 3A to FIG. 3C. For example, when the user faces downward at more than the predetermined angle to the horizontal direction, there may be set a display mode in which a content more detailed than the content displayed when the user has a posture staring at the horizon direction is displayed. Further, for example, when the user faces upward at more than the predetermined angle to the horizontal direction, there may be set a display mode in which a content related to the content displayed when the user has a posture staring at the horizon direction is displayed.

Moreover, the number of display modes according to an embodiment of the present disclosure is not limited to three as shown in FIG. 3A to FIG. 3C, and may be any number of one or two or more.

The information processing apparatus according to an embodiment of the present disclosure performs, for example, (1) the setting processing and (2) the display control processing, as processing related to an information processing method according to an embodiment of the present disclosure.

Here, the information processing apparatus according to an embodiment of the present disclosure sets the display mode on the basis of the posture information indicating the posture of the head of the user in the setting processing according to an embodiment of the present disclosure, and therefore can set the display mode by head motion smaller in movement than the arm for operating the operation device. Accordingly, the information processing apparatus according to an embodiment of the present disclosure can reduce a conscious load and an operation load on the user, thereby improving the convenience of the user.

Note that there has been described above the example that the information processing apparatus according to an embodiment of the present disclosure performs (1) the setting processing and (2) the display control processing, as the processing related to the information processing method according to an embodiment of the present disclosure, but the information processing method according to an embodiment of the present disclosure is not limited thereto.

The information processing apparatus according to an embodiment of the present disclosure may not perform the display control processing according to an embodiment of the present disclosure, as the processing related to the information processing method according to an embodiment of the present disclosure, and the display control processing according to an embodiment of the present disclosure may be performed in the external apparatus of the information processing apparatus according to an embodiment of the present disclosure. Even when the display control processing according to an embodiment of the present disclosure is performed in the external apparatus, the information processing apparatus according to an embodiment of the present disclosure can reduce the conscious load and the operation load on the user by performing the setting processing according to an embodiment of the present disclosure.

Further, "(1) the processing (setting processing), and "(1) the processing (setting processing) and (2) the processing (display control processing)" are obtained by dividing the processing related to the information processing method according to an embodiment of the present disclosure as a matter of convenience. Therefore, in the processing related to the information processing method according to an embodiment of the present disclosure, "(1) the processing (setting processing)" may be considered as two or more processing (by any manner of division). Further, in the processing related to the information processing method according to an embodiment of the present disclosure, "(1) the processing (setting processing) and (2) the processing (display control processing)" may be considered as one processing, and "(1) the processing (setting processing) and (2) the processing (display control processing)" may be considered as two or more processing (by any manner of division).

Processing Related to Information Processing Method According to an Embodiment of the Present Disclosure Next, the processing related to the information processing method according to an embodiment of the present disclosure will be described more specifically. In the following, there will be described an example that, as the processing related to the information processing method according to an embodiment of the present disclosure, the information processing apparatus according to an embodiment of the present disclosure performs (1) the processing (setting processing) and (2) the processing (display control processing).

(1) Setting Processing

The information processing apparatus according to an embodiment of the present disclosure sets the display mode corresponding to the posture of the user on the basis of the posture information.

Here, an example of the setting of the display mode according to an embodiment of the present disclosure includes newly setting the display mode, or switching the set display mode to the new display mode. When the display mode is already set, the information processing apparatus according to an embodiment of the present disclosure switches a display mode from the set display mode to the new display mode corresponding to the posture of the user.

(1-1) First Example of Setting Processing

The information processing apparatus according to an embodiment of the present disclosure sets a display mode, for example, according to a result of threshold processing between a value indicated by the posture information and a threshold value related to the setting of the display mode. The threshold value related to switching of the display mode according to an embodiment of the present disclosure is set by, for example, "the number of display modes −1", and the display mode is determined by one step or a plurality of steps of threshold processing, and the determined display mode is set. A setting example of the display mode according to the result of the threshold processing according to an embodiment of the present disclosure will be described later.

Here, an example of the threshold value related to the setting of the display mode according to an embodiment of the present disclosure includes a fixed value such as a preset value.

Note that the threshold value related to the setting of the display mode according to an embodiment of the present disclosure is not limited thereto. For example, the threshold value related to the setting of the display mode according to an embodiment of the present disclosure may be a variable value set based on action information indicating an action of the user (to be described later), the set display mode, a user operation, or the like.

When the threshold value according to the set display mode is set as the threshold value related to the setting of the display mode according to an embodiment of the present disclosure, for example, it may be possible to change how to switch a display mode between a case where one display mode being set is switched to another new display mode and a case where another display mode being set is switched to the new one display mode. Accordingly, it may be possible to realize switching having hysteresis, such as a case where switching from one display mode to another display mode is harder to switch than switching from another display mode to the one display mode.

Moreover, processing using the threshold value related to the setting of the display mode set based on the action information will be described in a second example of the setting processing shown in (1-2) described below.

(1-2) Second Example of Setting Processing

The information processing apparatus according to an embodiment of the present disclosure sets a display mode, for example, on the basis of the action information in addition to the posture information.

The information processing apparatus according to an embodiment of the present disclosure sets a display mode, for example, corresponding to the posture of the user indicated by the posture information, and the action of the user indicated by the action information. That is, the display mode is newly set based on the action information when the setting processing related to the second example is performed. Further, when the display mode is already set, switching of the display mode from the set display mode to the new display mode is controlled on the basis of the action information when the setting processing related to the second example is performed.

Here, the action information according to an embodiment of the present disclosure is data indicating the action of the user. The action of the user indicated by the action information includes any action that can be estimated, for example, on the basis of sensor information such as velocity and acceleration during walking, running, walking up and down stairs, traveling by a vehicle or a bicycle, or a static state, or analysis of an captured image captured by an imaging device. Further, the action information may further include data indicating a level of the action of the user (for example, a level based on a speed of walking, a speed of running, or the like).

The processing related to the estimation of the action of the user based on the sensor information, the analysis of the captured image, or the like may be performed in the information processing apparatus according to an embodiment of the present disclosure, or may be performed in the external apparatus of the information processing apparatus according to an embodiment of the present disclosure. When the processing related to the estimation of the action of the user is performed in the information processing apparatus according to an embodiment of the present disclosure, the information processing apparatus according to an embodiment of the present disclosure uses the action information indicating the estimation result of the action. Further, when the processing related to the estimation of the action of the user is performed in the external apparatus of the information processing apparatus according to an embodiment of the present disclosure, the information processing apparatus according to an embodiment of the present disclosure uses the action information acquired from the external apparatus.

(1-2-1) Setting of Display Mode by Setting of Threshold Value Related to Setting of Display Mode Based on Action Information When setting a display mode on the basis of the action information, the information processing apparatus according to an embodiment of the present disclosure sets the display mode by, for example, setting the threshold value related to the setting of the display mode on the basis of the action information.

When the threshold value related to the setting of the display mode is set based on the action information, the information processing apparatus according to an embodiment of the present disclosure specifies a value related to the threshold value corresponding to the action information, for example, by using the action information, and a "table (or database) in which an action of the user is associated with a value related to the threshold value". The value related to the threshold value according to an embodiment of the present disclosure includes the threshold value related to the setting of the display mode, and an adjustment value (positive or negative value) for adjusting a reference value of the threshold value. When the value related to the threshold value according to an embodiment of the present disclosure is the threshold value related to the setting of the display mode, the information processing apparatus according to an embodiment of the present disclosure defines the value related to the threshold value corresponding to the action information as the threshold value related to the setting of the display mode. Further, when the value related to the threshold value according to an embodiment of the present disclosure is the adjustment value, the information processing apparatus according to an embodiment of the present disclosure adds the adjustment value to the reference value, and defines the value obtained by adding the adjustment value to the reference value as the threshold value related to the setting of the display mode. Note that it should be appreciated that the method for setting the threshold value related to the setting of the display mode on the basis of the action information is not limited to the example described above.

An example of the threshold value related to the setting of the display mode, which is set based on the action information, includes a threshold value limiting switching of a display mode from the set display mode to the new display mode, and a threshold value allowing switching of a display mode from a display mode set by a smaller change in posture of the user to the new display mode.

The information processing apparatus according to an embodiment of the present disclosure, for example, when the action information indicates a first action limiting switching of a display mode, sets the threshold value related to the setting of the display mode to the threshold value limiting switching of a display mode from the set display mode to the new display mode. Specifically, the information processing apparatus according to an embodiment of the present disclosure, for example, when the action information indicates the first action, sets the threshold value related to the setting of the display mode to a value that is harder to switch a display mode than the reference value (hereinafter referred to as a "first value").

For example, as described above, when the action information indicates the first action, the information processing apparatus according to an embodiment of the present disclosure can limit switching of a display mode from the set display mode to the new display mode when the threshold value is set to the first value.

Note that, when the action information indicates the first action, the method for limiting switching of a display mode from the set display mode to the new display mode is not limited to setting the threshold value to the first value as described above. For example, the information processing apparatus according to an embodiment of the present disclosure, when the action information indicates the first action, may limit switching of a display mode from the set display mode to the new display mode not by newly setting a display mode.

Moreover, the information processing apparatus according to an embodiment of the present disclosure, for example, when the action information indicates a second action promoting switching of a display mode, defines the threshold value related to the setting of the display mode as a threshold value for switching a display mode from the set display mode to the new display mode by a smaller change in posture of the user. Specifically, the information processing apparatus according to an embodiment of the present disclosure, for example, when the action information indicates the second action, sets the threshold value related to the setting of the display mode to a value that is easy to switch a display mode than the reference value (hereinafter referred to as a "second value").

For example, as described above, when the action information indicates the second action, the information processing apparatus according to an embodiment of the present disclosure can switch a display mode from the set display mode to the new display mode by a smaller change in posture of the user.

Here, whether the action of the user indicated by the action information corresponds to the first action or the second action is determined by, for example, a value related to the threshold value recorded in the "table (or database) in which an action of the user is associated with a value related to the threshold value". That is, the first action or the second action according to an embodiment of the present disclosure can be optionally set by, for example, a person (for example, a designer or a manufacturer of the information processing apparatus according to an embodiment of the present disclosure) who sets the "table (or database) in which an action of the user is associated with a value related to the threshold value".

For example, as described above, when the threshold value related to the setting of the display mode on the basis of the action information is set, for example, the followings can be achieved.

- The display mode is not switched except for when the action indicated by the action information is a static state (an example of a use case when the second value is set as the threshold value related to the setting of the display mode). This prevents distraction of attention of the user by a change in display mode, for example, when the user is running or walking up and down stairs, to achieve safer setting of the display mode.
- When a level of the action of the user indicated by the action information is equal to or more than a predetermined set level, the display mode is not switched or it is hard to switch the display mode (another example of a use case when the second value is set as the threshold value related to the setting of the display mode).
- When a level of the action of the user indicated by the action information is equal to or more than a predetermined set level, the display mode is switched by a smaller change in posture of the user (an example of a use case when the first value is set as the threshold value related to the setting of the display mode).

As described above, when the threshold value related to the setting of the display mode is set on the basis of the action information, and the UI display is controlled by using the posture of the head of the user, the UI that is assumed to have a risk in the eyewear or the like can be realized, such as a case where, when the user is traveling, the display is not suddenly changed. Note that it should be appreciated that an example that is realized when the threshold value related to the setting of the display mode is set on the basis of the action information is not limited to the example described above.

(1-2-2) Setting of One or Both of Specified Content of Display Mode and Number of Display Modes, Corresponding to Action Indicated by Action Information The information processing apparatus according to an embodiment of the present disclosure sets a display mode corresponding to the action indicated by the action information, for example, by changing one or both of a specified content of a display mode and the number of display modes on the basis of the action information.

When changing a specified content of a display mode, such as one or two or more of software to be executed, how to display a content to be displayed, and an information amount of the content to be displayed on the basis of the action information, the information processing apparatus according to an embodiment of the present disclosure specifies the specified content of the display mode corresponding to the action indicated by the action information, for example, on the basis of a "table (or database) in which an action of the user is associated with identification information of the display mode capable of identifying the display mode (for example, an ID), and a specified content of the display mode", and the action information.

For example, as described above, when the specified content of the display mode corresponding to the action indicated by the action information is set, the information processing apparatus according to an embodiment of the present disclosure can change the specified content of the display mode such as the software to be executed, by the action of the user indicated by the action information.

Moreover, when changing the number of display modes on the basis of the action information, the information processing apparatus according to an embodiment of the present disclosure specifies a settable display mode corresponding to the action indicated by the action information, for example, on the basis of a "table (or database) in which an action of the user is associated with identification information of one or two or more settable display modes" and the action information.

For example, as described above, when the settable display mode corresponding to the action indicated by the action information is specified, the information processing apparatus according to an embodiment of the present disclosure can change the number of settable display modes by the action of the user indicated by the action information.

An example of changing the number of settable display modes by the action of the user indicated by the action information includes the example described below. Note that it should be appreciated that an example of changing the number of settable display modes by the action of the user indicated by the action information is not limited to the example described below.

- "When the action indicated by the action information is a static state, 5 display modes can be set, when the action indicated by the action information is walking, 4 display modes can be set, when the action indicated by the action information is running, 3 display modes can be set" and so on. In this manner, the larger the action is, the more the number of settable display modes is reduced. As described above, when the larger the action is, the more the number of settable display modes is reduced, wrong setting of the display mode due to the action can be suppressed, and the user can have enough time for switching the display mode.

Note that it should be appreciated that the method for changing one or both of the specified content of the display mode and the number of display modes on the basis of the action information is not limited to the example described above.

(1-2-3)

The information processing apparatus according to an embodiment of the present disclosure can perform processing combining the processing shown in (1-2-1) described above with the processing shown in (1-2-2) described above.

The information processing apparatus according to an embodiment of the present disclosure performs, for example, the processing shown in (1-1) described above or the processing shown in (1-2) described above, and sets the "display mode corresponding to the posture of the user" or the "display mode corresponding to the posture and the action of the user".

(2) Display Control Processing

The information processing apparatus according to an embodiment of the present disclosure controls display by using the display mode set by the processing (setting processing) shown in (1) described above. The information processing apparatus according to an embodiment of the present disclosure controls display, for example, according to the specified content of the set display mode.

Here, an example of the display control by using the set display mode includes the control shown in (a) to (e) described below. Note that it should be appreciated that an example of the display control by using the set display mode is not limited to the examples shown in (a) to (e) described below.

(a) First Example of Display Control by Set Display Mode

The information processing apparatus according to an embodiment of the present disclosure, for example, when there are a plurality of display modes in which the same content is displayed, changes an information amount of the content to be displayed according to the display mode.

For example, there will be referred to the content to be displayed in the display mode "NOW" (first display mode) shown in FIG. 3A, and the content to be displayed in the display mode "FUTURE" (third display mode) shown in FIG. 3C.

The icon indicating what the user does (an example of the same content) is displayed in both display modes of the display mode "NOW" (first display mode) shown in FIG. 3A and the display mode "FUTURE" (third display mode) shown in FIG. 3C. However, while the icon indicating what the user does is displayed only for some users of the registered users in the display mode "NOW" (first display mode) shown in FIG. 3A, the icon indicating what the user does is displayed for all the registered users in the display mode "FUTURE" (third display mode) shown in FIG. 3C. Therefore, in the display mode "NOW" (first display mode) shown in FIG. 3A and the display mode "FUTURE" (third display mode) shown in FIG. 3C, the display mode in which the same content is displayed is used, but the information amount of the content to be displayed is different therebetween.

Note that it should be appreciated that an example that the information amount of the content to be displayed is changed according to the display mode is not limited to the example described with reference to FIG. 3A and FIG. 3C.

(b) Second Example of Display Control by Set Display Mode

The information processing apparatus according to an embodiment of the present disclosure, for example, when there are a plurality of display modes in which the same content is displayed, changes how to display the content according to the display mode.

For example, there will be referred to the content to be displayed in the display mode "NOW" (first display mode) shown in FIG. 3A, and the content to be displayed in the display mode "FUTURE" (third display mode) shown in FIG. 3C.

The icon of the registered user (an example of the same content) is displayed in both display modes of the display mode "NOW" (first display mode) shown in FIG. 3A and the display mode "FUTURE" (third display mode) shown in FIG. 3C. However, how to display the icon of the registered user is different as shown in FIG. 3A and FIG. 3C. Therefore, in the display mode "NOW" (first display mode) shown in FIG. 3A and the display mode "FUTURE" (third display mode) shown in FIG. 3C, the display mode in which the same content is displayed is used, but how to display the content to be displayed is different therebetween.

Note that it should be appreciated that an example that how to display the content is changed according to the display mode is not limited to the example described with reference to FIG. 3A and FIG. 3C.

(c) Third Example of Display Control by Set Display Mode

The information processing apparatus according to an embodiment of the present disclosure displays, for example, a different content in a different display mode.

For example, there will be referred to the content to be displayed in the display mode "NOW" (first display mode) shown in FIG. 3A, and the content to be displayed in the display mode "MEMORIES" (second display mode) shown in FIG. 3B.

As described above, in the display mode "NOW" (first display mode) shown in FIG. 3A, the icon of the registered user (so-called friend user) is displayed, and in the display mode "MEMORIES" (second display mode) shown in FIG. 3B, the time line corresponding to the specific user is displayed. Therefore, the different content is displayed between the display mode "NOW" (first display mode) shown in FIG. 3A, and the content to be displayed in the display mode "MEMORIES" (second display mode) shown in FIG. 3B.

Note that it should be appreciated that an example that the different content is displayed in the different display mode is not limited to the example described with reference to FIG. 3A and FIG. 3B.

(d) Fourth Example of Display Control by Set Display Mode

The information processing apparatus according to an embodiment of the present disclosure, when switching a display mode from the set display mode to the new display mode, performs animation display so as to allow the user to recognize the switching of the display mode more naturally.

An example of the animation display includes any animation display such as fade-in, fade-out, and switching of an a blending value. Further, a switching speed of the display mode by using the animation display may be constant, or may be changed according to a change rate of the posture of the user or the magnitude of the change in posture of the user.

An example of processing related to display control related to the fourth example will be described later.

(e) Fifth Example of Display Control by Set Display Mode

The information processing apparatus according to an embodiment of the present disclosure may perform display control, for example, by combining two or more of (a) to (d) described above.

The information processing apparatus according to an embodiment of the present disclosure controls display according to the specified content of the set display mode to thereby achieve the display corresponding to the display mode, for example, as shown in FIG. 3A to FIG. 3C.

Note that the display control processing according to an embodiment of the present disclosure is not limited thereto.

For example, the information processing apparatus according to an embodiment of the present disclosure may control display in the set display mode on the basis of information on the position of the visual line of the user.

Here, the information on the position of the visual line of the user is, for example, data indicating the position of the visual line of the user, or data that can be used to identify the position of the visual line of the user, (or data that can be used to estimate the position of the visual line of the user, and so on).

An example of the data indicating the position of the visual line of the user includes "coordinate data indicating the position of the visual line of the user on the display screen". The position of the visual line of the user on the display screen is indicated, for example, by coordinates in a coordinate system using a reference position in the display screen as an original point. The reference position on the display screen according to an embodiment of the present disclosure may be, for example, a preset fixed point, or a position that can be set based on a user operation or the like.

The information on the position of the visual line of the user according to an embodiment of the present disclosure is the coordinate data indicating the position of the visual line of the user on the display screen, the information processing apparatus according to an embodiment of the present disclosure acquires the coordinate data indicating the position of the visual line of the user on the display screen, for example, from the external apparatus that has identified (or estimated) the position of the visual line of the user by using a visual line detection technology. Further, in this case, the information processing apparatus according to an embodiment of the present disclosure may acquire the coordinate data indicating the position of the visual line of the user on the display screen, for example, by identifying (or estimating) the position of the visual line of the user by using the visual line detection technology.

Here, the position of the visual line of the user on the display screen can be identified, for example, by using the visual line by using the visual line detection technology, and the position and the face direction or the like of the user to the display screen, detected from an captured image obtained by imaging a direction in which an image (a moving image or a still image) is displayed on the display screen. The direction in which an image (a moving image or a still image) is displayed on the display screen, according to an embodiment of the present disclosure, is, for example, a direction of a side in which the image displayed on the display screen is viewed by the user, on the display screen. Note that the method for identifying the visual line of the user on the display screen is not limited thereto. For example, the information processing apparatus and the external apparatus according to an embodiment of the present disclosure can use any technology that can identify the visual line of the user on the display screen.

Moreover, an example of the visual detection technology according to an embodiment of the present disclosure includes a method for detecting a visual line, for example, on the basis of a position of a moving point of an eye (for example, a point corresponding to a movable portion in an eye such as an iris or a pupil) with respect to a reference point of an eye (for example, a point corresponding to an immovable portion in an eye such as an inner corner or corneal reflection). Note that the visual detection technology according to an embodiment of the present disclosure is not limited thereto. For example, the information processing apparatus and the external apparatus according to an embodiment of the present disclosure can detect the visual line of the user by using any visual detection technology using a "corneal reflection method", a "pupil cornea reflection method", a "sclera reflection method", and an "active appearance model (AAM) that detects a face and then tracks a feature point obtained by an eye, a nose, a mouth and the like" or the like.

Note that the data indicating the position of the visual line of the user according to an embodiment of the present disclosure is not limited to the "coordinate data indicating the position of the visual line of the user on the display screen".

For example, when the user wears a transmission type HMD, the data indicating the position of the visual line of the user according to an embodiment of the present disclosure may be "coordinate data indicating a position in a real object in a real space viewed by the user".

The position in the real object in the real space viewed by the user is identified (or estimated), for example, on the basis of a three-dimensional image of the real object, and a visual line vector identified (or estimated) by using the visual line detection technology. Note that the method for identifying the position in the real object in the real space viewed by the user is not limited thereto, and any technology that can identify the position in the real object in the real space viewed by the user may be used.

The information on the position of the visual line of the user according to an embodiment of the present disclosure is the coordinate data indicating the position in the real object in the real space viewed by the user, the information processing apparatus according to an embodiment of the present disclosure acquires the coordinate data indicating the position in the real object in the real space viewed by the user, for example, from the external apparatus. Further, in this case, the information processing apparatus according to an embodiment of the present disclosure may acquire the coordinate data indicating the position in the real object in the real space viewed by the user, for example, by identifying (or estimating) the position in the real object in the real space viewed by the user by using the visual line detection technology.

Further, an example of the data that can be used to identify the position of the visual line of the user according to an embodiment of the present disclosure includes captured image data obtained by imaging a direction in which an image is displayed on the display screen (captured image data obtained by imaging a direction opposed to the display screen from a display screen side). Further, the data that can be used to identify the position of the visual line of the user may further include detection data of any sensor for obtaining a detection value that can be used to improve estimation accuracy of the position of the visual line of the user, such as detection data of an infrared sensor for detecting an infrared ray in a direction in which an image is displayed on the display screen.

Further, the data that can be used to identify the position of the visual line of the user according to an embodiment of the present disclosure may be, for example, a three-dimensional image of the real object, and data related to identification of the visual line vector of the user.

For example, when using the data that can be used to identify the position of the visual line of the user, the information processing apparatus according to an embodiment of the present disclosure performs, for example, processing related to the method for identifying the position of the visual line of the user according to an embodiment of the present disclosure as described above to identify (estimate) the position of the user.

The information processing apparatus according to an embodiment of the present disclosure acquires the position of the visual line of the user, for example, by the processing as described above. The information processing apparatus according to an embodiment of the present disclosure then performs processing related to a UI operation using visual line input such as the execution of a specific application, or the movement of a cursor.

When the information processing apparatus according to an embodiment of the present disclosure further performs display control based on the information on the position of the visual line of the user as the display control processing according to an embodiment of the present disclosure, the user can perform a UI operation by combining the movement of the head with the visual line.

Specific Example of Processing Related to Information Processing Method According to an Embodiment of the Present Disclosure Next, there will be described a specific example of the processing related to the information processing method according to an embodiment of the present disclosure.

Figure 4:
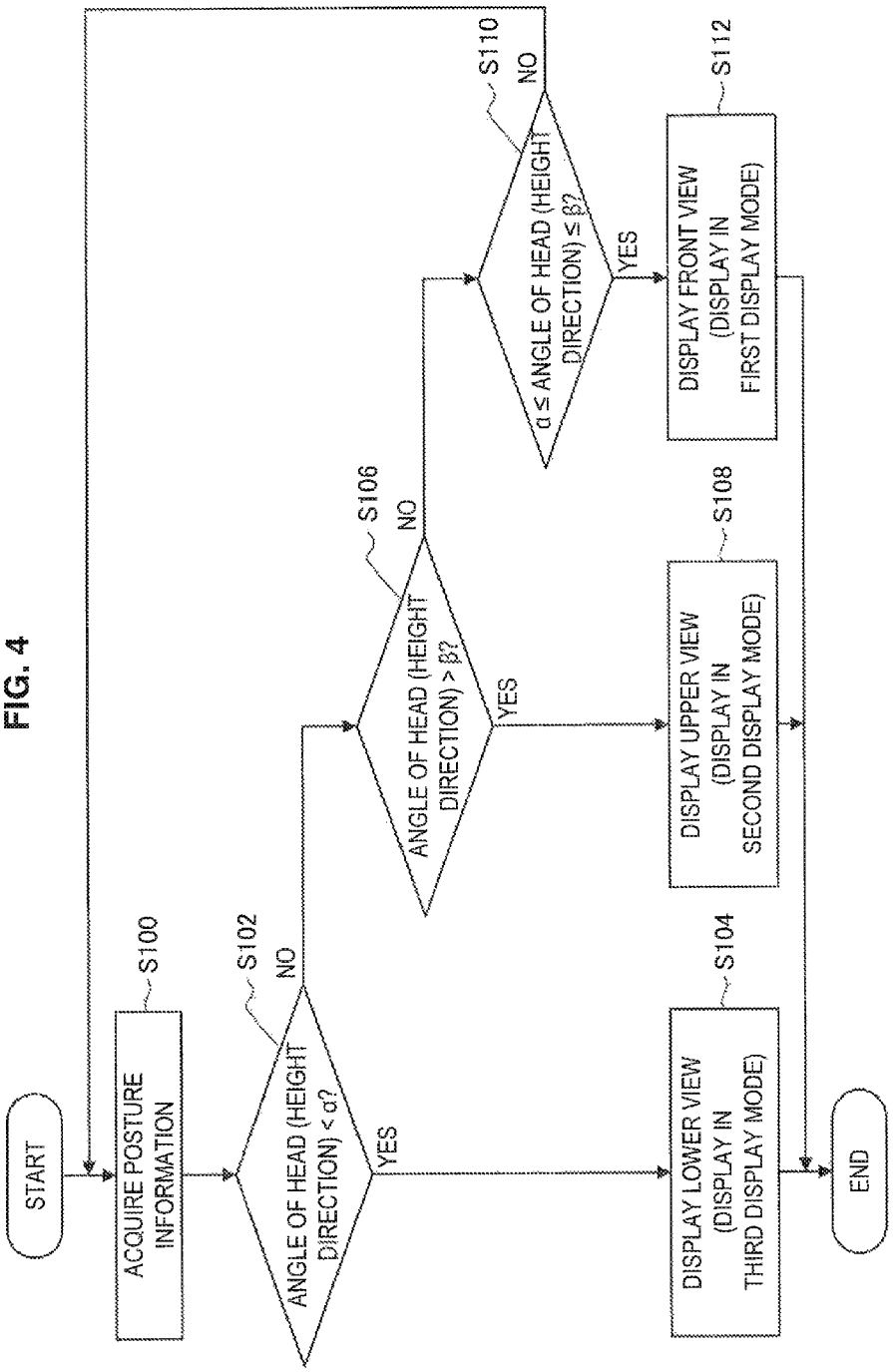
FIG. 4 is an explanatory diagram for explaining a first example of processing related to the information processing method according to an embodiment of the present disclosure.

[3-1] First Example of Processing Related to Information Processing Method According to an Embodiment of the Present Disclosure FIG. 4 is an explanatory diagram for explaining a first example of processing related to the information processing method according to an embodiment of the present disclosure, and shows an example that the display mode "NOW" (first display mode), the display mode "MEMORIES" (second display mode), and the display mode "FUTURE" (third display mode), as shown in FIG. 1, are switched. The processing at Steps S102, S106 and S110 shown in FIG. 4 and the processing at Steps S104, S108 and S112 shown in FIG. 4 partially correspond to the example of the processing (setting processing) shown in (1) described above. Further, the processing at Steps S104, S108 and S112 shown in FIG. 4 partially corresponds to the example of the processing (display control processing) shown in (2) described above. The "α" (alpha) and "β" (beta) shown in FIG. 4 are each an example of the threshold value related to the setting of the display mode, where α<β.

The information processing apparatus according to an embodiment of the present disclosure acquires the posture information (S100). In the following, there will be described an example that the posture information includes data indicating an angle of the head to the horizontal direction.

The information processing apparatus according to an embodiment of the present disclosure determines whether or not the angle of the head to the horizontal direction is less than the threshold value α (S102). Note that the information processing apparatus according to an embodiment of the present disclosure may determine whether or not the angle of the head to the horizontal direction is equal to or less than the threshold value α at Step S102.

When it is determined that the angle is less than the threshold value α at Step S102, the information processing apparatus according to an embodiment of the present disclosure sets the display mode "FUTURE" (third display mode), and performs, for example, the display shown in FIG. 3C (S104).

Here, for example, when the display mode "NOW" (first display mode) is set before the display mode "FUTURE" (third display mode) is set at Step S104, the display is switched from the display shown in FIG. 3A to the display shown in FIG. 3C.

In the example of switching as described above, for example, the content of the information is displayed more so as to cover the whole display screen when the user wearing the HMD or the like faces a his/her foot side than when facing the horizontal direction (nearly horizontal direction).

Moreover, in the example of switching as described above, animation display may be performed so as to easily understand a relationship of the content of the information being displayed between when the user wearing the HMD or the like faces the horizontal direction (nearly horizontal direction) and when facing the his/her foot side. An example of the animation display includes animation such as a bird's eye view in which a detailed view is changed to an overview. Further, the altitude in the bird's eye view may depend on the posture of the head of the user.

Here, for example, when the display mode "MEMORIES" (second display mode) is set before the display mode "FUTURE" (third display mode) is set at Step S104, the display is switched from the display shown in FIG. 3B to the display shown in FIG. 3C.

Further, when it is not determined that the angle is less than the threshold value α at Step S102, the information processing apparatus according to an embodiment of the present disclosure determines whether or not the angle of the head to the horizontal direction is more than the threshold value β (S106). Note that the information processing apparatus according to an embodiment of the present disclosure may determine whether or not the angle of the head to the horizontal direction is equal to or more than the threshold value β at Step S104.

When it is determined that the angle of the head to the horizontal direction is more than the threshold value β at Step S106, the information processing apparatus according to an embodiment of the present disclosure sets the display mode "MEMORIES" (second display mode), and performs, for example, the display shown in FIG. 3B (S108). Here, for example, when another display mode is already set before the display mode "MEMORIES" (second display mode) is set at Step S106, the display mode is switched from another display mode to the display mode "MEMORIES" (second display mode).

Further, when it is not determined that the angle of the head to the horizontal direction is more than the threshold value β at Step S106, the information processing apparatus according to an embodiment of the present disclosure determines whether or not the angle of the head to the horizontal direction is equal to or more than the threshold value α and equal to less than the threshold value β (S110). Note that the information processing apparatus according to an embodiment of the present disclosure may determine whether or not the angle of the head to the horizontal direction is more than the threshold value α and less than the threshold value β at Step S104.

When it is determined that the angle of the head to the horizontal direction is equal to or more than the threshold value α and equal to or less than the threshold value β at Step S110, the information processing apparatus according to an embodiment of the present disclosure sets the display mode "NOW" (first display mode), and performs, for example, the display shown in FIG. 3A (S112). Here, for example, when another display mode is already set before the display mode "NOW" (first display mode) is set at Step S110, the display mode is switched from another display mode to the display mode "NOW" (first display mode).

Further, when it is not determined that the angle of the head to the horizontal direction is equal to or more than the threshold value α and equal to or less than the threshold value β at Step S110, the information processing apparatus according to an embodiment of the present disclosure repeats the processing from Step S100.

The information processing apparatus according to an embodiment of the present disclosure sets the display mode on the basis of the posture information, for example, by performing the processing shown in FIG. 4, and performs the display in the set display mode. Note that it should be appreciated that the processing related to the information processing method according to an embodiment of the present disclosure is not limited to the example shown in FIG. 4.

Figure 5:
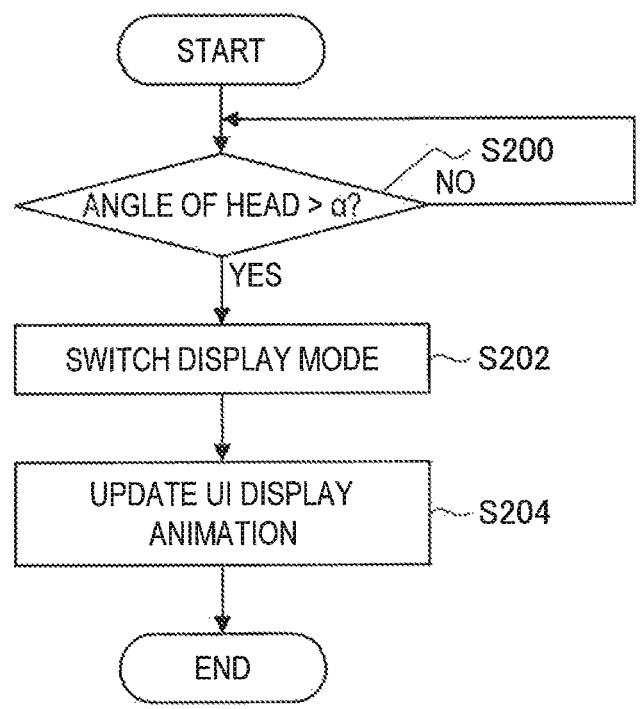
FIG. 5 is an explanatory diagram for explaining a second example of processing related to the information processing method according to an embodiment of the present disclosure.

[3-2] Second Example Related to Information Processing Method According to an Embodiment of the Present Disclosure FIG. 5 is an explanatory diagram for explaining a second example of processing related to the information processing method according to an embodiment of the present disclosure, and shows an example of the processing related to the animation display in the processing (display control processing) shown in (2) described above. FIG. 5 shows an example of the processing related to the animation display when the user wearing the HMD or the like faces more upward than the horizontal direction (nearly horizontal direction). The "α" shown in FIG. 5 is an example of the threshold value related to the setting of the display mode.

The information processing apparatus according to an embodiment of the present disclosure determines whether or not the angle of the head to the horizontal direction based on the posture information is more than the threshold value α (S200). Note that the information processing apparatus according to an embodiment of the present disclosure may determine whether or not the angle of the head to the horizontal direction is equal to or more than the threshold value α at Step S200.

When it is not determined that the angle of the head to the horizontal direction is more than the threshold value α at Step 200, the information processing apparatus according to an embodiment of the present disclosure, for example, does not proceed the processing until it is determined that the angle of the head to the horizontal direction is more than the threshold value α.

When it is determined that the angle of the head to the horizontal direction is more than the threshold value α at Step 200, the information processing apparatus according to an embodiment of the present disclosure switches the display mode from the set display mode to the new display mode (S202).

Further, the information processing apparatus according to an embodiment of the present disclosure, when switching the display mode from the set display mode to the new display mode, switches the display mode while changing the display by using animation (S204).

Here, a frame speed of the animation at Step S204 is set by using the angle of the head to the horizontal direction as shown in Formula (1) as follows.

(Frame speed of animation)=(Angle of head to horizontal direction)×(number of frames)   Formula (1)

When the frame speed of the animation is set by using the angle of the head to the horizontal direction, as described above, the more slowly the user moves the head, the more slowly the animation is switched, and the more quickly the user moves the head, the more quickly the animation is switched. Note that the frame speed of the animation at Step S204 may be constant.

The information processing apparatus according to an embodiment of the present disclosure realizes the animation display in the switching of the display mode, for example, by performing the processing shown in FIG. 5.

Note that the processing related to the animation display according to an embodiment of the present disclosure is not limited to the example shown in FIG. 5.

Figure 6:
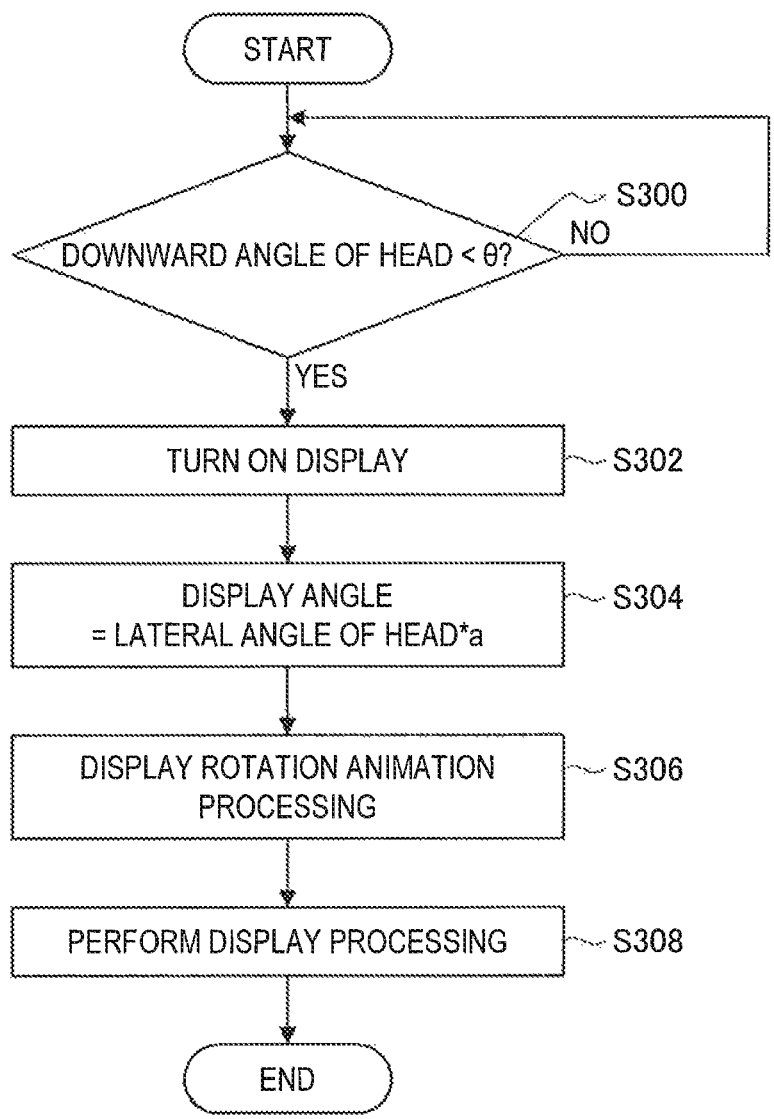
FIG. 6 is an explanatory diagram for explaining a second example of processing related to the information processing method according to an embodiment of the present disclosure.

FIG. 6 is an explanatory diagram for explaining a second example of processing related to the information processing method according to an embodiment of the present disclosure, and shows another example of the processing of the animation display in the processing (display control processing) shown in (2) described above. FIG. 6 shows an example of the processing related to the animation display when the user wearing the HMD or the like faces more downward (his/her foot side) than the horizontal direction (nearly horizontal direction). In the following, there will be described an example of the processing when the UI that overviews the map as shown in FIG. 3C from the sky (hereinafter referred to as an "overview map UI") is displayed. The "θ" (theta) shown in FIG. 6 is an example of the threshold value related to the setting of the display mode.

The information processing apparatus according to an embodiment of the present disclosure determines whether or not the angle of the head to the horizontal direction based on the posture information is less than the threshold value θ (S300). Note that the information processing apparatus according to an embodiment of the present disclosure may determine whether or not the angle of the head to the horizontal direction is equal to or less than the threshold value θ at Step S300.

When it is not determined that the angle of the head to the horizontal direction is less than the threshold value θ at Step 300, the information processing apparatus according to an embodiment of the present disclosure, for example, does not proceed the processing until it is determined that the angle of the head to the horizontal direction is less than the threshold value θ.

Further, when it is determined that the angle of the head to the horizontal direction is less than the threshold value θ at Step 300, the information processing apparatus according to an embodiment of the present disclosure brings the display to the on state (state possible to display)(S302). Note that, when the display is already in the on state, the information processing apparatus according to an embodiment of the present disclosure does not perform the processing of Step S302.

When it is determined that the angle of the head to the horizontal direction is less than the threshold value θ at Step 300, the information processing apparatus according to an embodiment of the present disclosure displays, for example, the overview map UI as shown in FIG. 3C. In this case, the information processing apparatus according to an embodiment of the present disclosure performs, for example, animation display that rotates the map according to the angle of the head of the user to the vertical direction.

When using the animation display that rotates the map as described above, the information processing apparatus according to an embodiment of the present disclosure sets a display angle for rotating the map by using the angle of the head of the user to the vertical direction, for example, as expressed by Formula (2) as follows (S304). Here, the "a" expressed in Formula (2) is a set value. The value of the "a" may be a fixed value, or a variable value variable by the angle of the head of the user to the vertical direction, a user operation, or the like. When the value of the "a" is a variable value according to the angle of the head of the user to the vertical direction, for example, the more the angle of the head of the user to the vertical direction, the more the value of the "a" to be set.

(Display angle)=(Angle to head to vertical direction)×$a$   Formula (2)

As described above, when the display angle for rotating the map by using the angle of the head to the vertical direction is set, for example, more natural operation feeling can be achieved so that, when the head of the user starts moving, the rotation amount is small, and the rotation amount is increased as the movement becomes large.

When the display angle is set at Step S304, the information processing apparatus according to an embodiment of the present disclosure performs the animation display that rotates the map (S306), and performs processing according to the set display mode (S308).

The information processing apparatus according to an embodiment of the present disclosure realizes the animation display when the overview map UI is displayed, for example, by performing the processing shown in FIG. 6.

FIG. 7 is an explanatory diagram for explaining a second example of processing related to the information processing method according to an embodiment of the present disclosure, and shows another example of the processing of the animation display in the processing (display control processing) shown in (2) described above. A, B, and C shown in FIG. 7 show cases in which the user (A3, B3 and C3 in FIG. 7) wearing the eyewear (A2, B2 and C2 in FIG. 7) faces the right direction, in time series, respectively, and A1, B1 and C1 in FIG. 7 show an example of a change in the display screen at this time.

For example, as shown in FIG. 7, when the user views the right, the display of the UI is changed according to the angle amount. At this time, the information processing apparatus according to an embodiment of the present disclosure, for example, adjusts the display amount so as to allow the user to view the whole image without a large change in direction. For example, when the angle of the head of the user to the vertical direction based on the posture information is inclined at 10 [°], the information processing apparatus according to an embodiment of the present disclosure moves the UI display displaying the icon and the like at 20 [']. Further, the information processing apparatus according to an embodiment of the present disclosure may change, for example, the speed amount of the animation as well as the position of the UI display according to the angle of the head of the user to the vertical direction.

Figure 8:
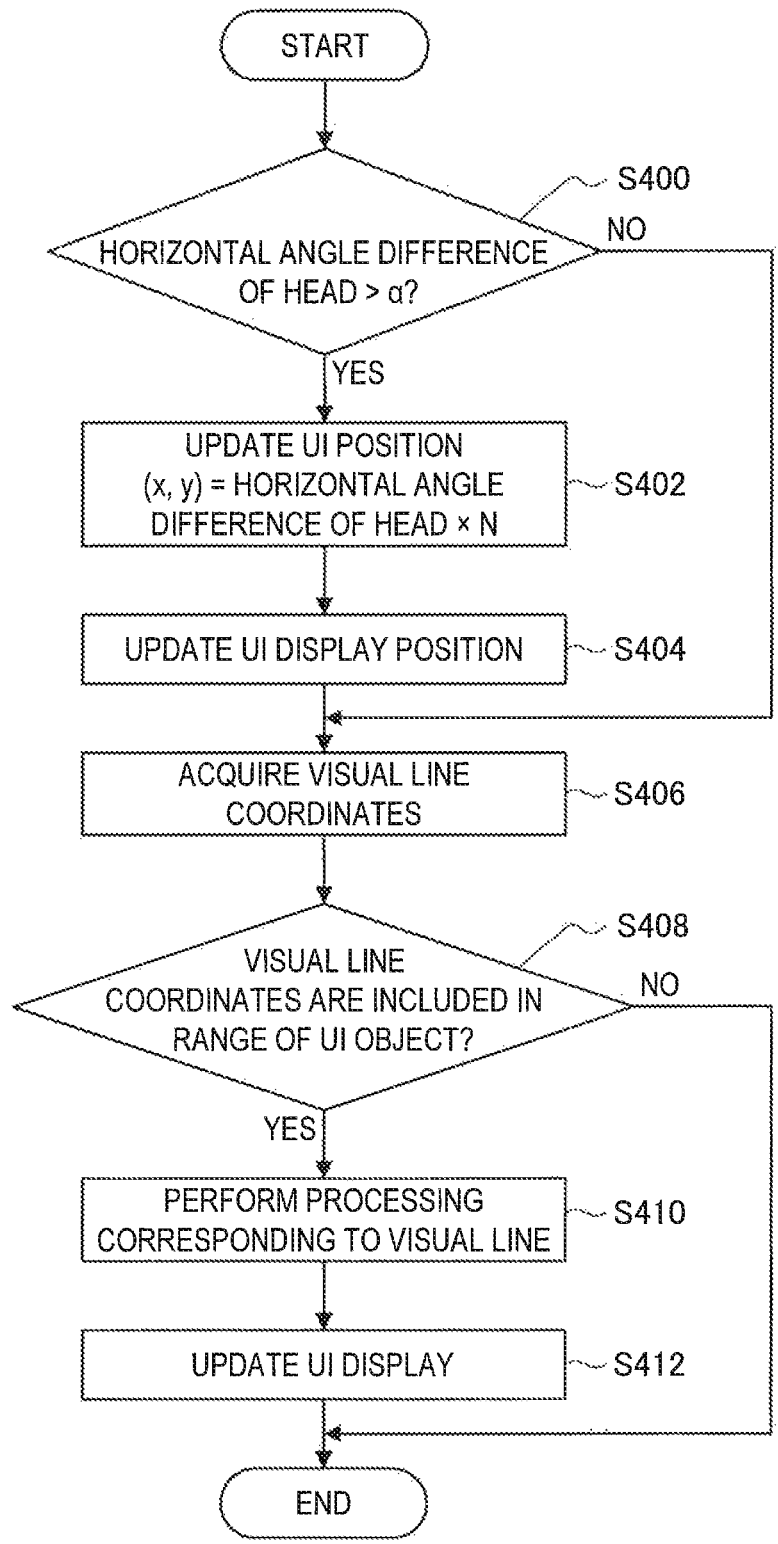
FIG. 8 is an explanatory diagram for explaining a third example of processing related to the information processing method according to an embodiment of the present disclosure.

[3-3] Third Example Related to Information Processing Method According to an Embodiment of the Present Disclosure FIG. 8 is an explanatory diagram for explaining a third example of processing related to the information processing method according to an embodiment of the present disclosure, and shows an example of the processing when the display in the set display mode is controlled on the basis of the information on the position of the visual line of the user, in the processing (display control processing) shown in (2) described above. The "α" shown in FIG. 8 is an example of the threshold value related to the setting of the display mode. Further, in FIG. 8, there will be described an example that the position such as the visual line position is expressed by a two-axis coordinate system of an x axis (horizontal axis) and a y axis (vertical axis).

The information processing apparatus according to an embodiment of the present disclosure determines whether or not the angle of the head to the vertical direction based on the posture information is more than the threshold value α (S400). Note that the information processing apparatus according to an embodiment of the present disclosure may determine whether or not the angle of the head to the vertical direction is equal to or more than the threshold value α at Step S400.

When it is not determined that the angle of the head to the vertical direction is more than the threshold value α at Step 400, the information processing apparatus according to an embodiment of the present disclosure performs, for example, the processing from Step S406 described later.

When it is determined that the angle of the head to the vertical direction is more than the threshold value α at Step 400, the information processing apparatus according to an embodiment of the present disclosure updates the UI position (S402, S404). The information processing apparatus according to an embodiment of the present disclosure updates the UI position, for example, by determining coordinates (x, y) by using Formula (3) as follows.

Here, the coordinates (x, y) are, for example, coordinates in a coordinate system using a reference point on the display screen as an original point. Further, the "N" shown in Formula (3) described below is a set value. The value of the "N" may be a fixed value, or a variable value variable by the angle of the head of the user to the vertical direction, a user operation, or the like. When the value of the "N" is a variable value according to the angle of the head of the user to the vertical direction, for example, the more the angle of the head of the user to the vertical direction, the more the value of the "N" to be set.

$$(x,y) = (\text{Angle difference of head to vertical direction}) \times N \quad \text{Formula (3)}$$

The information processing apparatus according to an embodiment of the present disclosure acquires coordinates indicating the position of the visual line of the user on the basis of the information on the position of the visual line of the user (hereinafter referred to as "visual line coordinates") (S406). In the following, the visual line coordinates are referred to as "GazePsition (x, y)".

The information processing apparatus according to an embodiment of the present disclosure determines whether or not the visual coordinates are included in a region of an object constituting the UI (for example, a region of the display screen corresponding to the object) (S408).

The information processing apparatus according to an embodiment of the present disclosure, for example, when the visual line coordinates satisfy Formula (4) and Formula (5) as follows, determines that the visual line coordinates are included in the range of the object constituting the UI. Here, the "UI_Region (x)" shown in Formula (4) is, for example, coordinates of the end in the horizontal direction in the region corresponding to the object constituting the UI, and the "w" shown in Formula (4) is a width (length in the horizontal direction) in the region corresponding to the object constituting the UI. The "UI_Region (y)" shown in Formula (5) is, for example, coordinates of the end in the vertical direction in the region corresponding to the object constituting the UI, and the "h" shown in Formula (5) is a height (length in the vertical direction) in the region corresponding to the object constituting the UI.

$$\text{UI\_Region}(x) < \text{GazePosition}(x) < \text{UI\_Region}(x) + w \quad \text{Formula (4)}$$

$$\text{UI\_Region}(y) < \text{GazePosition}(y) < \text{UI\_Region}(y) + h \quad \text{Formula (5)}$$

Note that the method for determining whether or not the visual line coordinates are included in the region of the object constituting the UI is not limited to the example described above. For example, the information processing apparatus according to an embodiment of the present disclosure, for example, when "the visual line coordinates are included in the object constituting the UI in any number of frames", or "coordinates indicated by an average value of the visual line coordinates in any number of frames are included in the object constituting the UI, may determine that the visual line coordinates are included in the region of the object constituting the UI.

When it is not determined that the visual line coordinates are included in the region of the object constituting the UI at Step S408, the information processing apparatus according to an embodiment of the present disclosure ends, for example, the processing in FIG. 8.

When it is determined that the visual line coordinates are included in the region of the object constituting the UI at Step S408, the information processing apparatus according to an embodiment of the present disclosure performs the processing corresponding to the corresponding visual line of the object (S410), and updates the UI display (S412). Here, an example of the processing corresponding to the visual line at Step S410 includes any processing such as processing of displaying a content of information related to the object having the range including the visual line coordinates. Further, the update of the UI display at Step S412 is performed, for example, in conjunction with timing of the update of a drawing frame of the UI.

The information processing apparatus according to an embodiment of the present disclosure controls the display in the set display mode on the basis of the information on the position of the visual line of the user, for example, by performing the processing shown in FIG. 8.

Here, when an operation using the visual line is possible, a quick operation is possible, but a detailed operation may be difficult due to variations in characteristics of the movement of the eyes. In contrast, for example, when the processing shown in FIG. 8 is performed, for example, in a UI allowing the user to select options, the options are switched by using the posture of the head to allow the user to select the plurality of options by his/her visual line.

Note that it should be appreciated that the processing when the display in the display mode set on the basis of the information on the position of the visual line of the user is controlled is not limited to the example shown in FIG. 8.

Figure 9:
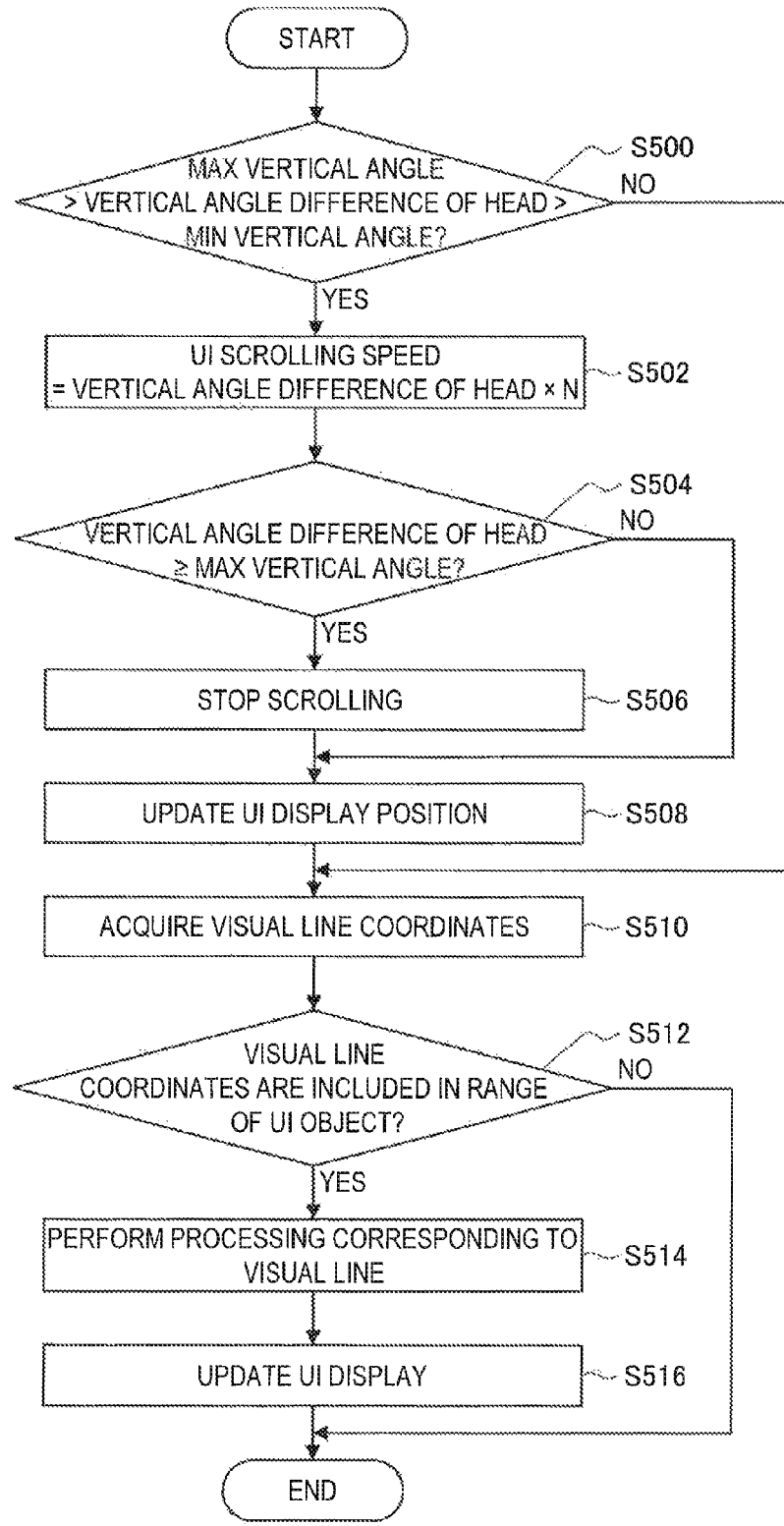
FIG. 9 is an explanatory diagram for explaining a fourth example of processing related to the information processing method according to an embodiment of the present disclosure.

[3-4] Fourth Example Related to Information Processing Method According to an Embodiment of the Present Disclosure FIG. 9 is an explanatory diagram for explaining a fourth example of processing related to the information processing method according to an embodiment of the present disclosure, and shows an example of the processing when the display in the set display mode is controlled on the basis of the posture information and the information on the position of the visual line of the user, in the processing (display control processing) shown in (2) described above. FIG. 9 shows an example of the processing when the UI indicating, for example, the time line shown in FIG. 3B is displayed.

The information processing apparatus according to an embodiment of the present disclosure determines whether or not the angle of the head to the horizontal direction based on the posture information is less than a maximum value of the angle of the head to the horizontal direction and more than a minimum value of the angle of the head to the horizontal direction (S500). Note that the information processing apparatus according to an embodiment of the present disclosure may determine, for example, whether or not the angle of the head to the horizontal direction is equal to or less than the maximum value of the angle of the head to the horizontal direction and is equal to or more than the minimum value of the angle of the head to the horizontal direction at Step S500.

When it is not determined that the angle of the head to the horizontal direction based on the posture information is less than the maximum value of the angle of the head to the horizontal direction and more than the minimum value of the angle of the head to the horizontal direction at Step 500, the information processing apparatus according to an embodiment of the present disclosure performs the processing from Step S510 described later.

When it is determined that the angle of the head to the horizontal direction based on the posture information is less than the maximum value of the angle of the head to the horizontal direction and more than the minimum value of the angle of the head to the horizontal direction at Step 500, the information processing apparatus according to an embodiment of the present disclosure determines a scrolling speed of the UI, for example, on the basis of the angle of the head to the horizontal direction (S502).

The information processing apparatus according to an embodiment of the present disclosure determines the scrolling speed of the UI, for example, by using Formula (6) as follows. The value of the "N" expressed in Formula (6) is a set value. The value of the "N" may be a fixed value, or a variable value variable by the angle of the head of the user to the vertical direction, a user operation, or the like.

$$\text{(Scrolling speed of UI)}=\text{(Angle difference of head to horizontal direction)} \times N \quad \text{Formula (6)}$$

When the value of the "N" is a variable value according to the angle of the head of the user to the horizontal direction, for example, the more the angle of the head of the user to the horizontal direction, the less the value of the "N" to be set. When the more the angle of the head of the user to the horizontal direction, the less the value of the "N" to be set, for example, it can be realized that the more the user faces upward, the more the scrolling speed is gradually reduced.

The information processing apparatus according to an embodiment of the present disclosure determines whether or not the angle of the head to the horizontal direction is equal to or more than the maximum value of the angle of the head to the horizontal direction (S504). Note that the information processing apparatus according to an embodiment of the present disclosure may determine, for example, whether or not the angle of the head to the horizontal direction is more than the maximum value of the angle of the head to the horizontal direction at Step S504.

When it is not determined that the angle of the head to the horizontal direction based on the posture information is equal to or more than the maximum value of the angle of the head to the horizontal direction at Step 504, the information processing apparatus according to an embodiment of the present disclosure performs the processing from Step S508 described later.

When it is determined that the angle of the head to the horizontal direction based on the posture information is equal to or more than the maximum value of the angle of the head to the horizontal direction at Step 504, the information processing apparatus according to an embodiment of the present disclosure stops the scrolling (S506).

When the processing at Steps S500 to S506 is performed, the user can control the scrolling speed, or the scrolling operation such as stopping.

The information processing apparatus according to an embodiment of the present disclosure updates the UI position (S508). The information processing apparatus according to an embodiment of the present disclosure updates the UI position on the basis of the posture of the head indicated by the posture information, for example, similarly to Step 404 in FIG. 8.

The information processing apparatus according to an embodiment of the present disclosure acquires the visual line coordinates on the basis of the information on the position of the visual line of the user, for example, similarly to Step 406 in FIG. 8 (S510).

The information processing apparatus according to an embodiment of the present disclosure determines whether or not the visual line coordinates are included in the region of the object constituting the UI (S512), for example, similarly to Step 408 in FIG. 8.

When it is not determined that the visual line coordinates are included in the region of the object constituting the UI at Step S512, the information processing apparatus according to an embodiment of the present disclosure ends, for example, the processing in FIG. 9.

When it is determined that the visual line coordinates are included in the region of the object constituting the UI at Step S512, the information processing apparatus according to an embodiment of the present disclosure performs the processing corresponding to the corresponding visual line of the object (S514) and updates the UI display (S516), for example, similarly to Steps S410 and S412 in FIG. 8.

The information processing apparatus according to an embodiment of the present disclosure controls the display in the set display mode on the basis of the posture information and the information on the position of the visual line of the user, for example, by performing the processing shown in FIG. 9. Therefore, the user wearing the HMD or the like can perform an operation by using the movement of the head and the visual line, and thereby can perform the UI operation more easily and more naturally.

Note that the processing when the display in the set display mode is controlled on the basis of the posture information and the information on the position of the visual line of the user is not limited to the example shown in FIG. 9.

The visual line operation may be effective even while the scrolling adjustment is performed. When the visual line operation is effective while the scrolling adjustment is performed, there is performed various processing such as displaying a content of detailed information corresponding to the object (for example, extension display of the time line), correcting the position of the object to a position that can be more easily viewed by the user, or reproducing a moving image or music embedded in the display of the time line, when the visual line coordinates are included in the region of the object constituting the UI.

(Information Processing Apparatus According to an Embodiment of the Present Disclosure)

Next, an example of the configuration of an information processing apparatus according to an embodiment of the present disclosure capable of performing the processing according to the information processing method according to an embodiment of the present disclosure described above will be described.

Figure 10:
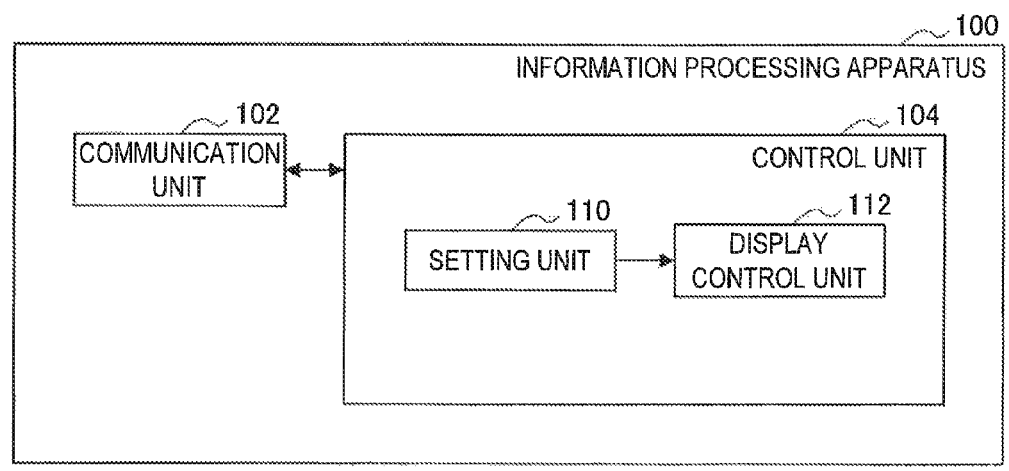
FIG. 10 is a block diagram showing an example of the configuration of an information processing apparatus according to an embodiment of the present disclosure.

FIG. 10 is a block diagram showing an example of the configuration of an information processing apparatus 100 according to an embodiment of the present disclosure. The information processing apparatus 100 includes, for example, a communication unit 102 and a control unit 104.

The information processing apparatus 100 may also include, for example, a read only memory (ROM) (not shown), a random access memory (RAM) (not shown), a storage unit (not shown), an operation unit (not shown) that can be operated by the user, and a display unit (not shown) that displays various screens on the display screen. The information processing apparatus 100 connects each of the above elements by, for example, a bus as a transmission path.

The ROM (not shown) stores programs used by the control unit 104, for example, and control data such as operation parameters. The RAM (not shown) temporarily stores programs executed by the control unit 104 and the like.

The storage unit (not shown) is a storage section included in the information processing apparatus 100, and stores various data such as data and applications related to the information processing method according to an embodiment of the present disclosure, such as data corresponding to each of the display modes such as data of the object related to the display such as the icon. Here, an example of the storage unit (not shown) includes a magnetic recording medium such as a hard disk, a nonvolatile memory such as an electrically erasable and programmable read only memory (EEPROM), and a flash memory. Further, the storage unit (not shown) may be detachable from the information processing apparatus 100.

An example of the operation unit (not shown) includes an operation input device described later. An example of the display unit (not shown) includes a display device described later.

[Hardware Configuration Example of Information Processing Apparatus 100]

Figure 11:
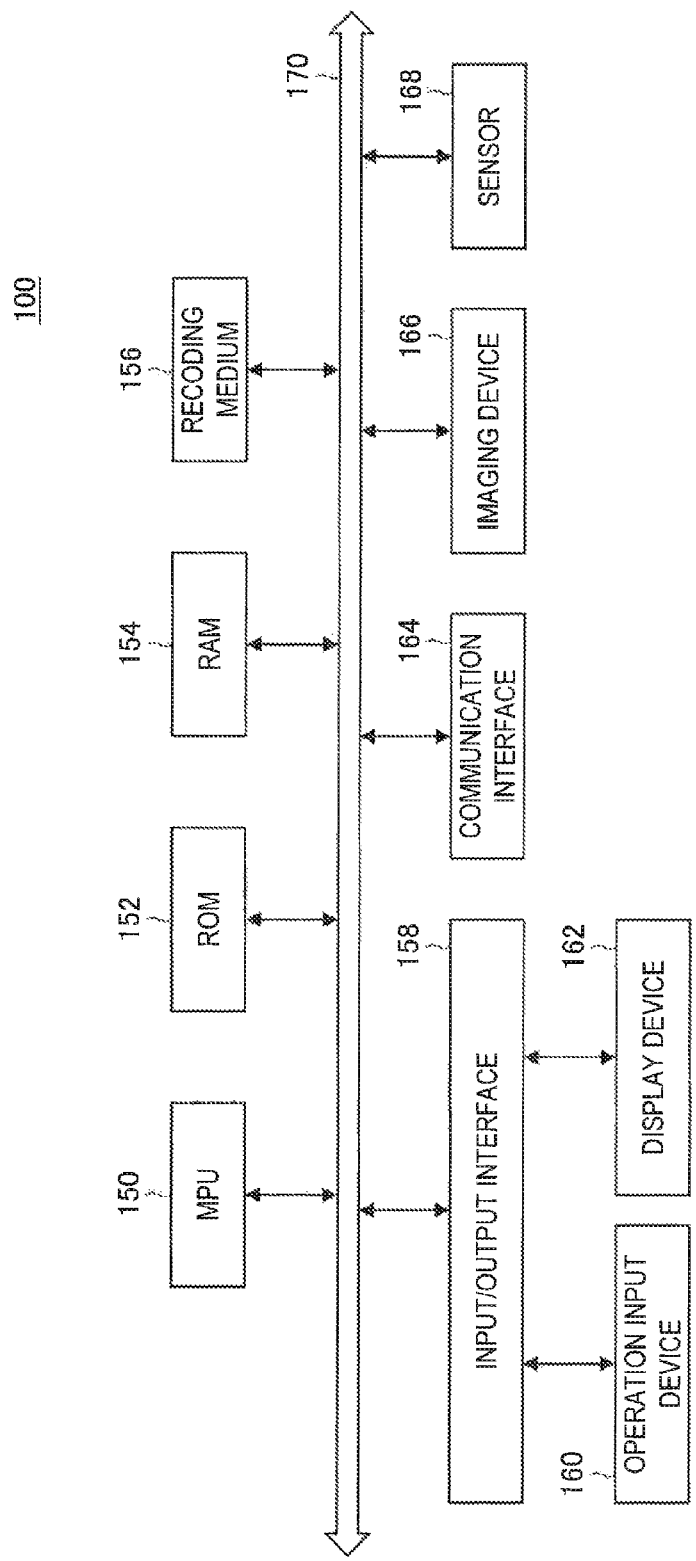
FIG. 11 is an explanatory diagram showing an example of the hardware configuration of the information processing apparatus according to an embodiment of the present disclosure.

FIG. 11 is an explanatory view showing an example of the hardware configuration of the information processing apparatus 100 according to an embodiment of the present disclosure. The information processing apparatus 100 includes, for example, an MPU 150, a ROM 152, a RAM 154, a recording medium 156, an input/output interface 158, an operation input device 160, a display device 162, a communication interface 164, an imaging device 166, and a sensor 168. The information processing apparatus 100 connects each structural element by, for example, a bus 170 as a transmission path of data.

The MPU 150 is configured by one or two or more processers, various kinds of processing circuits, and the like, which include an arithmetic circuit such as a micro processing unit (MPU), and functions as the control unit 104 that controls the whole of the information processing apparatus 100. Also, the MPU 150 acts as, for example, a setting unit 110 and a display control unit 112 in the information processing apparatus 100. Note that one or both of the setting unit 110 and the display control unit 112 may include a dedicated (or general-purpose) circuit that can realize the processing of each unit.

The ROM 152 stores programs used by the MPU 150 and control data such as operation parameters. The RAM 154 temporarily stores programs executed by the MPU 150 and the like.

The recording medium 156 functions as a storage unit (not shown) and stores, for example, data related to the information processing method according to an embodiment of the present disclosure such as data corresponding to each of display modes and various kinds of data such as applications.

An example of the recording medium 156 includes a magnetic recording medium such as a hard disk and a nonvolatile memory such as a flash memory. The storage unit (not shown) may be removable from the information processing apparatus 100.

The input/output interface 158 connects, for example, the operation input device 160 and the display device 162. The operation input device 160 functions as an operation unit (not shown) and the display device 162 functions as a display unit (not shown). An example of the input/output interface 158 includes a universal serial bus (USB) terminal, a digital visual interface (DVI) terminal, an high-definition multimedia interface (HDMI) (registered trademark) terminal, and various processing circuits.

The operation input device 160 is, for example, included in the information processing apparatus 100 and connected to the input/output interface 158 inside the information processing apparatus 100. An example of the operation input device 160 includes a button, a direction key, a rotary selector such as a jog dial, and a combination of these devices.

The display device 162 is, for example, included in the information processing apparatus 100 and connected to the input/output interface 158 inside the information processing apparatus 100. An example of the display device 162 includes a liquid crystal display, and an organic electroluminescence display (also called an organic light emitting diode display (OLED)).

It should be appreciated that the input/output interface 158 can also be connected to an external device such as an operation input device (for example, a keyboard and a mouse), a display device, an imaging device, and a sensor as an external apparatus of the information processing apparatus 100. The display device 162 may be a device capable of both the display and user operations such as a touch device.

The communication interface 164 is a communication section included in the information processing apparatus 100, and functions as a communication unit (not shown) for communicating by a radio or by a cable via a network (or directly) with an external apparatus such as an external projecting apparatus including an external HMD, an external eyewear, or an external projector. An example of the communication interface 164 includes a communication antenna and a radio frequency (RF) circuit (wireless communication), IEEE802.15.1 port and a transmitting/receiving circuit (wireless communication), IEEE802.11 port and a transmitting/receiving circuit (wireless communication), or a local area network (LAN) terminal and a transmitting/receiving circuit (wired communication). Further, the communication unit (not shown) may be a configuration corresponding to any standard capable of communication such as a USB terminal and a transmitting/receiving circuit, or any configuration capable of communication with an external apparatus via a network.

An example of the network according to an embodiment of the present disclosure includes a wire network such as a LAN and a wide area network (WAN), a wireless network such as a wireless local area network (WLAN) and a wireless wide area network (WWAN) via a base station, or the Internet using a communication protocol such as a transmission control protocol/internet protocol (TCP/IP).

The imaging device 166 is an imaging section included in the information processing apparatus 100, and generates an image (captured image) obtained by capturing an image. When the imaging device 166 is included, the processing such as the visual line detection can be performed by using the captured image generated by capturing an image by the imaging device 166.

The imaging device 166 includes, for example, a lens/imaging element, and a signal processing circuit. The lens/imaging element includes, for example, an optical lens, and an image sensor using a plurality of imaging elements such as a complementary metal oxide semiconductor (CMOS). The signal processing circuit includes, for example, an automatic gain control (AGC) circuit, and an analog to digital converter (ADC), and converts an analog signal generated by the imaging element into a digital signal (image data). The signal processing circuit also performs various kinds of processing related to, for example, a RAW phenomenon. Further, the signal processing circuit may perform various kinds of signal processing such as white balance correction processing, color-tone correction processing, gamma correction processing, YCbCr conversion processing, and edge emphasis processing.

The sensor 168 detects a value indicating the posture of the head of the user and outputs the detection result. The sensor 168 may generate, for example, the posture information according to the detection result to output the generated posture information. An example of the sensor 168 includes an angle velocity sensor. Note that the sensor 168 is not limited the angle velocity sensor. For example, the sensor 168 may be configured by one or two or more of any sensor capable of detecting the posture of the head, such as an angle velocity sensor or an acceleration sensor.

The information processing apparatus 100 performs the processing related to the information processing method according to an embodiment of the present disclosure, for example, by the configuration shown in FIG. 11. Note that the hardware configuration of the information processing apparatus 100 according to an embodiment of the present disclosure is not limited to the configuration shown in FIG. 11.

For example, when processing the captured image generated by the external imaging device, the information processing apparatus 100 may be configured not to include the imaging device 166.

Further, for example, when processing the processing shown in (1) described above on the basis of the posture information corresponding to the detection result of the external sensor, the information processing apparatus 100 may be configured not to include the sensor 168.

When configured to, for example, perform processing on a standalone basis, the information processing apparatus 100 may not include the communication device 164. The information processing apparatus 100 may also be configured not to include the recording medium 156 or the display device 162.

Referring to FIG. 10 again, an example of the configuration of the information processing apparatus 100 will be described. The communication unit 102 is a communication section included in the information processing apparatus 100, and communicates by a radio or by a cable via a network (or directly) with an external apparatus (external device) such as an external projecting apparatus including an external HMD, an external eyewear, or an external projector. The communication unit 102 is controlled for communication, for example, by the control unit 104.

An example of the communication unit 102 includes a communication antenna and RF circuit, and a LAN terminal and transmitting/receiving circuit, but the configuration of the communication unit 102 is not limited to the above example. For example, the communication unit 102 may adopt a configuration conforming to any standard capable of communication such as a USB terminal and transmitting/receiving circuit or any configuration capable of communicating with an external apparatus via a network.

The control unit 104 is configured by, for example, an MPU, and plays a role in controlling the whole of the information processing apparatus 100. Further, the control unit 104 includes, for example, the setting unit 110, and the display control unit 112, and plays an initiative role in performing the processing related to the information processing method according to an embodiment of the present disclosure.

The setting unit 110 plays an initiative role in performing the processing (setting processing) shown in (1) described above, and sets the display mode corresponding to the posture of the head of the user on the basis of the posture information. The setting unit 110 performs, for example, the processing shown in (1-1) described above or the processing shown in (1-2) described above to set the "display mode corresponding to the posture of the user", or the "display mode corresponding to the posture of the user and the action of the user".

The display control unit 112 plays an initiative role in performing the processing (display control processing) shown in (2) described above, and controls the display in the display mode set by the setting unit 110. Further, the display control unit 112 may control the display in the set display mode, for example, on the basis of the information on the position of the visual line of the user.

The control unit 104 plays an initiative role in performing the processing related to the information processing method according to an embodiment of the present disclosure, for example, by including the setting unit 110, and the display control unit 112.

The information processing apparatus 100 performs the processing related to the information processing method according to an embodiment of the present disclosure (for example, the processing (setting processing) shown in (1) described above and the processing (display control processing) shown in (2) described above), for example, by the configuration shown in FIG. 10.

Therefore, the information processing apparatus 100 can improve the convenience of the user, for example, by the configuration shown in FIG. 10.

Moreover, the information processing apparatus 100 can exhibit the successful effects achieved by performing the processing related to the information processing method according to an embodiment of the present disclosure, as described above, for example, by the configuration shown in FIG. 10.

Note that the configuration of the information processing apparatus according to an embodiment of the present disclosure is not limited to the configuration shown in FIG. 10.

For example, the information processing apparatus according to an embodiment of the present disclosure may include one or both of the setting unit 110 and the display control unit 112 shown in FIG. 10, separately from the control unit 104 (for example, as another processing circuit).

Further, when the processing (display control processing) shown in (2) described above is performed in, for example, the external apparatus, the information processing apparatus according to an embodiment of the present disclosure may not include the display control unit 112.

Further, the information processing apparatus according to an embodiment of the present disclosure may further include a posture detection unit that generates the posture information corresponding to the posture of the head of the user by using the detection result outputted from the sensor 168 or an external sensor having the same function as the sensor 168. When the posture detection unit is further included, the setting unit 110 performs the processing (setting processing) shown in (1) described above by using the posture information generated in the posture detection unit.

Further, the information processing apparatus according to an embodiment of the present disclosure may further include a visual line detection unit that acquires the coordinate data of the position of the visual line of the user on the display screen, for example, by identifying (or estimating) the position of the visual line of the user by using any visual line detection technology. When the visual line detection unit is further included, the display control unit 112 controls the display mode in the set display mode, for example, by using the coordinate data indicating the position of the visual line of the user acquired by the visual line detection unit, as the information on the position of the visual line of the user.

Further, the information processing apparatus according to an embodiment of the present disclosure may further include an action detection unit that detects the action of the user, for example, by performing the processing related to the estimation of the action of the user by using any action estimation technology. When the action detection unit is further included, one or both of the setting unit 110 and the display control unit 112 perform the processing, for example, by using the action information based on the detection result in the action detection unit.

Further, as described above, the "the processing (setting processing) shown in (1) described above" and the "the processing (setting processing) shown in (1) described above and the processing (display control processing) shown in (2) described above" are obtained by dividing the processing of the information processing method according to an embodiment of the present disclosure as a matter of convenience. Therefore, the configuration for realizing the information processing method according to an embodiment of the present disclosure is not limited to the setting unit 110 and the display control unit 112 shown in FIG. 10, and may be a configuration according to how to divide the processing related to the information processing method according to an embodiment of the present disclosure.

Further, the information processing apparatus 100, for example, when being configured to perform processing on a standalone basis, or performing communication via an external communication device, may not include the communication unit 102.

As described above, an embodiment of the present disclosure has been described by using the information processing apparatus, but is not limited thereto. An embodiment of the present disclosure can be applied to various apparatuses, for example, an apparatus used while being mounted on the head of the user such as an HMD or an eyewear, a computer such as a personal computer (PC) or a server, a communication apparatus and a tablet apparatus such as a cellular phone or a smart phone. An embodiment of the present disclosure can be applied to a processing IC that can be incorporated in the apparatuses described above.

The information processing apparatus according to an embodiment of the present disclosure can be applied to a system including one or two or more apparatuses based on the assumption of connection to a network (or communication among apparatuses), such as cloud computing. That is, the information processing apparatus according to an embodiment of the present disclosure as described above can be realized as an information processing system that performs the processing related to the information processing method according to an embodiment of the present disclosure by using a plurality of apparatuses.

(Program According to an Embodiment of the Present Disclosure)

A program for allowing a computer to function as the information processing apparatus according to an embodiment of the present disclosure (for example, a program capable of executing the processing related to the information processing method according to an embodiment of the present disclosure, such as the "processing (setting processing) shown in (1) described above" and the "processing (setting processing) shown in (1) described above and the processing (display control processing) shown in (2) described above", is executed by a processor or the like in the computer, to thereby improve the convenience of the user.

Also, effects achieved by the above processing according to the information processing method according to an embodiment of the present disclosure can be achieved by a program causing a computer to function as an information processing apparatus according to an embodiment of the present disclosure being performed by a processor or the like in the computer.

It should be understood by those skilled in the art that various modifications, combinations, sub-combinations and alterations may occur depending on design requirements and other factors insofar as they are within the scope of the appended claims or the equivalents thereof.

For example, the above shows that a program (computer program) causing a computer to function as an information processing apparatus according to an embodiment of the present disclosure is provided, but embodiments can further provide a recording medium caused to store the program.

The above configurations show examples of embodiments of the present disclosure and naturally come under the technical scope of the present disclosure.

Effects described in this specification are only descriptive or illustrative and are not restrictive. That is, the technology according to the present disclosure can achieve other effects obvious to a person skilled in the art from the description of this specification, together with the above effects or instead of the above effects.

(1) An image processing apparatus including:
a setting unit configured to set a display mode corresponding to a posture of a user on the basis of posture information indicating the posture of the head of the user.

(2) The image processing apparatus according to (1),
wherein the setting unit sets the display mode according to a result of threshold processing between a value indicated by the posture information and a threshold value related to the setting of the display mode.

(3) The image processing apparatus according to (2),
wherein the threshold value related to the setting of the display mode is a fixed value.

(4) The image processing apparatus according to (2),
wherein the threshold value related to the setting of the display mode is a variable value that is set on the basis of action information indicating an action of the user.

(5) The image processing apparatus according to any one of (1) to (4),
wherein the setting unit, when the display mode is already set, switches the display mode from the set display mode to a new display mode corresponding to the posture of the user.

(6) The image processing apparatus according to (5),
wherein the setting unit further controls the switching of the display mode from the set display mode to the new display mode on the basis of the action information indicating the action of the user.

(7) The image processing apparatus according to (6),
wherein the setting unit, when the action information indicates a first action that limits the switching of the display mode, limits the switching of the display mode from the set display mode to the new display mode.

(8) The image processing apparatus according to (7),
wherein the setting unit switches the display mode from the set display mode to the new display mode according to the result of the threshold processing between the value indicated by the posture information and the threshold value related to the setting of the display mode, and
wherein the setting unit, when the action information indicates the first action, sets the threshold value related to the setting of the display mode to a first value that is harder to switch the display mode than a reference value, and performs the threshold processing.

(9) The image processing apparatus according to any one of (6) to (8),
wherein the setting unit, when the action information indicates a second action that promotes the switching of the display mode, switches the display mode from the set display mode to the new display mode by a smaller change in the posture of the user.

(10) The image processing apparatus according to (9),
wherein the setting unit switches the display mode from the set display mode to the new display mode according to the result of the threshold processing between the value indicated by the posture information and the threshold value related to the setting of the display mode, and
wherein the setting unit, when the action information indicates the second action, sets the threshold value related to the setting of the display mode to a second value that is easier to switch the display mode than a reference value, and performs the threshold processing.

(11) The image processing apparatus according to any one of (1) to (10),
wherein the setting unit further sets a display mode corresponding to the posture of the user and an action of the user on the basis of action information indicating the action of the user.

(12) The image processing apparatus according to (11),
wherein the setting unit changes the number of display modes that can be set, on the basis of the action information.

(13) The image processing apparatus according to any one of (1) to (12), further including:
a display control unit configured to control display in the set display mode.

(14) The image processing apparatus according to (13),
wherein the display control unit, when there are a plurality of display modes having a same content to be displayed, changes an information amount of the content to be displayed according to the display mode.

(15) The image processing apparatus according to (13) or (14),
wherein the display control unit, when there are a plurality of display modes having a same content to be displayed, changes how to display the content according to the display mode.

(16) The image processing apparatus according to any one of (13) to (15),
wherein the display control unit displays a different content in a different display mode.

(17) The image processing apparatus according to any one of (13) to (16),
wherein the display control unit controls the display in the set display mode on the basis of information on a position of a visual line of the user.

(18) An information processing method that is executed by an information processing apparatus, including:
setting a display mode corresponding to a posture of a user on the basis of posture information indicating the posture of the head of the user.

(19) A program for allowing a computer to execute:
setting a display mode corresponding to a posture of a user on the basis of posture information indicating the posture of the head of the user.

What is claimed is:
1. An image processing apparatus comprising:
at least one processor configured to:
acquire posture information indicating an upward movement of a head-mounted display device or a downward movement of the head-mounted display device from at least one of an acceleration sensor and an angular velocity sensor;
change a display mode from a first display mode to a second display mode on the basis of the upward movement of the head-mounted display device;

change the display mode from the first display mode to a third display mode on the basis of the downward movement of the head-mounted display device;

control, on the basis of the first display mode, the head-mounted display device to display a first image;

control, on the basis of the second display mode, the head-mounted display device to display a second image, the second image including at least one image different from the first image; and control, on the basis of the third display mode, the head-mounted display device to display a third image, the third image being a three-dimensional bird's eye view map image, wherein the first image and the third image each comprises the same content but displayed differently.

2. The image processing apparatus according to claim 1, wherein the at least one processor is further configured to control the head-mounted display device to change a first position of the first image in at least one of a horizontal direction or a vertical direction on the basis of a result that the upward movement of the head-mounted display device goes over a predetermined threshold.

3. The image processing apparatus according to claim 2, wherein the predetermined threshold is a fixed value.

4. The image processing apparatus according to claim 2, wherein the predetermined threshold is variable on the basis of action information indicating a movement condition of the head-mounted display device.

5. The image processing apparatus according to claim 4, wherein the movement condition corresponds to at least one of walking, running, walking up and down stairs, traveling by a vehicle or a bicycle, a static state, and a level based on a speed of the head-mounted display device.

6. The image processing apparatus according to claim 5, wherein the movement condition includes a first movement condition and a second movement condition having a higher action level than the first movement condition, and wherein the at least one processor is further configured to control the head-mounted display device to make the first position of the first image harder to change in the second movement condition than in the first movement condition.

7. The image processing apparatus according to claim 5, wherein the movement condition includes a first movement condition and a second movement condition having a higher action level than the first movement condition, and wherein the at least one processor is further configured to control the head-mounted display device to prohibit the first position of the first image from changing in the second movement condition.

8. The image processing apparatus according to claim 1, wherein the first image includes a plurality of first images, wherein the second image includes a plurality of second images, wherein the plurality of second images include at least one image of the plurality of first images, and wherein a number of the plurality of second images is larger than a number of the plurality of first images.

9. The image processing apparatus according to claim 1, wherein the at least one processor is further configured to control the head-mounted display device to move a position of the first image against a movement of the head-mounted display device in the horizontal direction.

10. The image processing apparatus according to claim 1, wherein the at least one processor is further configured to control the head-mounted display device to place the first image above the three-dimensional bird's eye view map image.

11. The image processing apparatus according to claim 10, wherein the first image corresponds to at least one object having positional data indicating a position of the at least one object on the three-dimensional bird's eye view map image, and wherein the at least one processor is further configured to control the head-mounted display device to place the first image above the three-dimensional bird's eye view map image on the basis of the positional data.

12. The image processing apparatus according to claim 11, wherein the at least one processor is configured to control the head-mounted display device to place, as the first image, an image of a first user and an image of a second user above the three-dimensional bird's eye view map image to represent a positional relationship of the first user and the second user in the real space.

13. The image processing apparatus according to claim 1, wherein the second image displayed in the second display mode is rotated relative to a vertical direction with respect to the first image displayed in the first display mode.

14. The image processing apparatus according to claim 1, wherein the at least one processor is configured to control the head-mounted display device to center the three-dimensional bird-view map image around the location of the user.

15. The image processing apparatus according to claim 1, wherein the second image, based on the upward movement, displays content that is different from the content of the first image and the third image.

16. The image processing apparatus according to claim 1, wherein the three-dimensional bird's eye view map image is based on a posture of a head of a user indicated by the posture information.

17. An information processing method that is executed by an information processing apparatus, comprising:

acquiring posture information indicating an upward movement of a head-mounted display device or a downward movement of the head-mounted display device from at least one of an acceleration sensor or an angular velocity sensor;

changing a display mode from a first display mode to a second display mode on the basis of the upward movement of the head-mounted display device;

changing the display mode from the first display mode to a third display mode on the basis of the downward movement of the head-mounted display device;

controlling, on the basis of the first display mode, the head-mounted display device to display a first image; and controlling, on the basis of the second display mode, the head-mounted display device to display a second image; and controlling, on the basis of the third display mode, the head-mounted display device to display a third image, the third image being a three-dimensional bird's eye view map image, wherein the first image and the third image each comprises the same content but displayed differently.

18. A non-transitory computer-readable medium having embodied thereon a program, which when executed by a computer, causes the computer to execute a method, the method comprising:

acquiring posture information indicating an upward movement of a head-mounted display device or a downward movement of the head-mounted display device from at least one of an acceleration sensor or an angular velocity sensor;

changing a display mode from a first display mode to a second display mode on the basis of the upward movement of the head-mounted display device;

changing the display mode from the first display mode to a third display mode on the basis of the downward movement of the head-mounted display device;

controlling, on the basis of the first display mode, the head-mounted display device to display a first image; and controlling, on the basis of the second display mode, the head-mounted display device to display a second image; and controlling, on the basis of the third display mode, the head-mounted display device to display a third image, the third image being a three-dimensional bird's eye view map image, wherein the first image and the third image each comprises the same content but displayed differently.

\* \* \* \* \*